(12) United States Patent
Shukla et al.

(10) Patent No.: US 7,642,035 B2
(45) Date of Patent: Jan. 5, 2010

(54) SENSITIZED PHOTOCHEMICAL SWITCHING FOR CHOLESTERIC LIQUID CRYSTAL DISPLAYS

(75) Inventors: Deepak Shukla, Webster, NY (US); Krishnan Chari, Fairport, NY (US)

(73) Assignee: Industrial Technology Research Institute, Hsinchu (TW)

( * ) Notice: Subject to any disclaimer, the term of this patent is extended or adjusted under 35 U.S.C. 154(b) by 419 days.

(21) Appl. No.: 11/403,970

(22) Filed: Apr. 13, 2006

(65) Prior Publication Data

US 2007/0243342 A1   Oct. 18, 2007

(51) Int. Cl.
G11B 7/244 (2006.01)
G11B 7/245 (2006.01)
C09K 19/58 (2006.01)
C09K 19/52 (2006.01)
G02B 6/00 (2006.01)
C09K 19/38 (2006.01)
C09K 19/36 (2006.01)

(52) U.S. Cl. .............. 430/270.11; 252/299.5; 252/299.7; 252/299.01; 430/20; 385/143

(58) Field of Classification Search .......... 428/1.1, 428/1.3; 252/299.91, 299.5, 299.01, 299.7; 430/20, 270.11; 349/2; 385/143
See application file for complete search history.

(56) References Cited

U.S. PATENT DOCUMENTS 5,668,614 A    9/1997  Chien et al.
6,808,603 B1 * 10/2004 Nishino et al. ......... 204/157.15
6,969,578 B2 * 11/2005 Robello et al. .......... 430/270.14
7,459,263 B2 * 12/2008 Farid et al. ............. 430/270.11
7,563,389 B2 *  7/2009 Shukla et al. .......... 252/299.01
2005/0136357 A1 *  6/2005 Farid et al. ............. 430/270.11
2009/0092770 A1 *  4/2009 Shukla et al. ............. 428/1.4
2009/0092907 A1 *  4/2009 Shukla et al. ............. 430/20

FOREIGN PATENT DOCUMENTS

GB   2355720       2/2001
JP   2003073562   12/2003
WO   98/57223     12/1998

OTHER PUBLICATIONS

A. Yu. Bobrovsky, N.I. Boiko and V.P. Shibaev Liq. Cryst. 25 (1998), p. 679.
P. van de Witte, J.C. Galan and J. Lub Liq. Cryst. 24 (1998), p. 819.
M. Brehmer, L. Lub and P. van de Witte Adv. Mater. 10 (1998), p. 1438.
English Translation by computer for JP 2003073562, http://www4.ipdl.inpit.go.jp/Tokujitu/PAJdetail.ipdl?N0000=60&N0120=01&N2001=2&N3001=2003-073562.
Office Action for U.S. Appl. No. 12/331,773 dated Jun. 17, 2009.

* cited by examiner

*Primary Examiner*—Shean C Wu
(74) *Attorney, Agent, or Firm*—Alston & Bird LLP

(57) ABSTRACT

The present invention relates to photo-tunable dopant compositions comprising a photo-reactive chiral compound capable of undergoing a photochemical reaction resulting in the loss of chirality, and a triplet sensitizer. The present invention also relates to a display comprising a substrate, a liquid crystalline layer thereon, wherein the liquid crystalline layer comprises a nematic host, at least one chiral dopant, a photo-reacted compound, and a triplet sensitizer, and at least one transparent conductive layer. The present invention also relates to a method of tuning a cholesteric liquid crystal material comprising providing at least one mesogenic compound, at least one triplet sensitizer, and at least one photo-reactive chiral compound; combining the at least one mesogenic compound, at least one triplet sensitizer, and at least one photo-reactive chiral compound to form a mixture; and irradiating the mixture for a period of time.

29 Claims, No Drawings

SENSITIZED PHOTOCHEMICAL SWITCHING FOR CHOLESTERIC LIQUID CRYSTAL DISPLAYS

FIELD OF THE INVENTION

The present invention relates to photo-tunable chiral dopants (PTCDs) for use in applications as memory elements, display, or coatings for wave guides

BACKGROUND OF THE INVENTION

Chiral nematic (also referred to as cholesteric) liquid crystals can be made to exhibit different optical states under different electrical field conditions and are characterized by a unique combination of properties, including optical bistability, making them particularly useful in display applications. Depending upon the magnitude and shape of the electric field, the optical state of the material can be changed between light scattering and light reflecting states, or any one of a number of intermediate states there between which can be made to reflect any desired intensity of colored light along a continuum of such states, thus providing gray scale.

With such chiral nematic materials, a low electric field pulse generally results in a light scattering focal conic texture. The application of a sufficiently high electric field pulse, i.e., an electric field high enough to homeotropically align the liquid crystal directors, will, upon removal of the pulse, drive the material to a light reflecting twisted planar texture that can be any desired color depending upon the pitch length of the liquid crystal. The light scattering and light reflecting states can be made to remain stable at zero field. If a sufficiently high electric field is maintained, the material is transparent until the field is removed. When the field is turned off quickly, the material reforms to the light reflecting state and, when the field is turned off slowly, the material reforms to the light scattering state. Electric field pulses of various magnitudes below that necessary to drive the material from the stable reflecting state to the stable scattering state will drive the material to intermediate states that are themselves typically stable. These multiple stable states indefinitely reflect colored light of an intensity between that reflected by the reflecting and scattering states. Thus, depending upon the magnitude of the electric field pulse the material exhibits stable gray scale reflectivity. Application of mechanical stress to the material can also be used to drive the material from the light scattering to the light reflecting state.

The color reflected by a chiral nematic liquid crystal depends upon the pitch length of the liquid crystal, which is in turn dependent upon the amount of chiral material in the liquid crystal. The pitch length of the liquid crystal materials may be adjusted based upon the following equation (1):

$$\lambda_{max} = n_{av} p_o \quad (1)$$

where $\lambda_{max}$ is the peak reflection wavelength, that is, the wavelength at which reflectance is a maximum, $n_{av}$ is the average index of refraction of the liquid crystal material, and $p_o$ is the natural pitch length of the chiral nematic helix. Definitions of chiral nematic helix and pitch length and methods of its measurement, are known to those skilled in the art such as can be found in the book, Blinov, L. M., Electro-optical and Magneto-Optical Properties of Liquid Crystals, John Wiley & Sons Ltd. 1983.

The wavelength of the reflected light can also be controlled by adjusting the chemical composition, since cholesterics can either consist of exclusively chiral molecules or of nematic molecules with a chiral dopant dispersed throughout. In this case, the dopant concentration is used to adjust the chirality and thus the pitch. For most concentrations of chiral dopants, the pitch length induced by the dopant is inversely proportional to the concentration of the dopant. The proportionality constant is given by the following equation (2):

$$p_o = 1/(HTP \cdot c) \quad (2)$$

where c is the concentration of the chiral dopant and HTP (helical twisting power) is the proportionality constant.

One of the original approaches to photo-tuning of helical pitch length and $\lambda$max, of cholesteric liquid crystals was to add chiral dopants that were photoactive (see, A. Yu. Bobrovsky, N. I. Boiko and V. P. Shibaev Liq. Cryst. 25 (1998), p. 679; A. Yu. Bobrovsky, N. I. Boiko and V. P. Shibaev Liq. Cryst. 26 (1999), p. 1749; P. van de Witte, J. C. Galan and J. Lub Liq. Cryst. 24 (1998), p. 819; M. Brehmer, L. Lub and P. van de Witte Adv. Mater. 10 (1998), p. 1438).

The main principle of the development of such light-controllable liquid crystal is based on the synthesis of photochromic copolymers whose macromolecules consist of mesogenic (as a rule, nematogenic) and combined photo-tunable chiral dopant (PTCD) groups, which are chemically linked in the common monomer unit. In this case, mesogenic fragments are responsible for the formation of the nematic phase, chiral groups provide the twisting of the nematic phase and formation of helical supramolecular structure. Finally, photo-tunable chiral dopant fragments can easily change their molecular structure under the light irradiation.

The irradiation with a certain wavelength leads to the photo-induced transformations of the photo-tunable chiral dopant affecting both the configuration and shape of the side-chain group. This leads to a decrease both in the anisotropy of photo-tunable chiral dopant group and the helical twisting power of a given chiral group. A decrease in helical twisting power leads to the untwisting of the cholesteric helix, which is accompanied by a shift in the selective light reflection maximum to longer wavelengths. Thus, using light irradiation as the external control factor, one may effectively modify the optical properties of polymer films by changing the local supramolecular helical structure.

As noted above, selective adjustment of the pitch length of a liquid crystal, and hence the color reflected thereby, can be accomplished by using photo-tunable chiral dopants (PTCDs). Irradiation of a photo-tunable chiral dopant with, for example, ultra violet (UV) light or other high energy source such as laser, results in conversion of chiral photo-tunable chiral dopant to an achiral molecule or to a racemic mixture. When one or more photo-tunable chiral dopants are included in a chiral nematic liquid crystal material, the pitch length of the resulting liquid crystal mixture can be either extended or shortened by varying exposures to UV light. By irradiating different regions of the material with different amounts of UV through the use of masking techniques, the pitch lengths of each region can be tuned to reflect a different color, thereby creating different colored pixels or regions of spot color in the liquid crystal material itself.

U.K. Patent Application No. GB 2355720 discloses a process of preparing a reflective film by using a photodegradable chiral compound. GB 2355720 describes a process for preparing a reflective film by coating a polymerizable cholesteric liquid crystal (CLC) material onto a substrate, aligning the material into planar orientation, and polymerizing the material by exposure to actinic radiation, characterized in that the polymerizable material comprises at least one photodegradable chiral compound that loses its chirality when being exposed to actinic radiation. Also disclosed is the use of said reflective film in optical, electrooptical, information storage, decorative and security applications, a liquid crystal display device, and a photodegradable compound.

U.S. Pat. No. 5,668,614 discloses a tunable chiral material (TCM) that can be changed from chiral to achiral or to a racemic mixture by irradiating with, for example, UV light or a high energy source such as laser. Further disclosed is a light modulating liquid crystal cell comprising a light modulating chiral nematic liquid crystal material including a tunable chiral material, wherein different regions of the liquid crystal material exhibit different reflection wavelengths. The cell is prepared by partially exposing the liquid crystal material with the tunable chiral material to photo-irradiation, e.g. through a photomask, leading to a change of the chirality of the tunable chiral material and thus to a change of the helical pitch in the exposed parts of the chiral nematic liquid crystal material.

WO 98/57223 discloses a multi domain liquid crystal display device comprising a layer of nematically ordered liquid crystalline material containing a chiral dopant sandwiched between two substrates. The liquid crystal layer comprises at least two types of sub-pixels in which the twist senses of the liquid crystalline material are mutually opposite, and the composition of the chiral dopant in the different types of sub-pixels is different. The device is manufactured by sandwiching between the substrates a layer of liquid crystalline material containing an isomerisable chiral dopant with a first twist sense and a non-isomerisable chiral dopant with an opposite twist sense, and photoirradiating the layer through a photomask. This causes the isomerisable dopant in the exposed parts of the layer to convert its chirality and thus its twist sense, leading to a change of the helical pitch in the exposed parts.

However, in order to achieve desired change in chiral materials as described in U.S. Pat. No. 5,668,614 and WO 98/57223, irradiation with UV light of high intensity and long duration is required. Therefore high lamp powers and long irradiation times are needed, which is a serious drawback for mass production. This is especially disadvantageous in case the isomerizable chiral compound is used in a photocurable or photopolymerizable liquid crystal mixture, where the light used to induce a change in the isomerizable chiral compound also has the undesirable effect of inducing a premature polymerization process in the mixture. Furthermore, UV irradiation of the mixture with high radiation doses (i.e. high radiation intensities and long radiation periods) can cause undesired degradation of the other components of the liquid crystal mixture.

PROBLEM TO BE SOLVED

There remains a need for liquid crystal materials, which are easy to manufacture, stable to manufacturing exposure to light, and readily available.

SUMMARY OF THE INVENTION

The present invention relates to a photo-tunable dopant composition comprising a photo-reactive chiral compound, wherein the photo-reactive chiral compound is capable of undergoing a photochemical reaction resulting in the loss of the chirality of the photo-reactive chiral compound, and a triplet sensitizer. The present invention also relates to a display comprising a substrate, a liquid crystalline layer thereon, wherein the liquid crystalline layer comprises a nematic host, at least one chiral dopant, a photo-reacted compound, and a triplet sensitizer, and at least one transparent conductive layer.

The present invention also relates to a method of tuning a cholesteric liquid crystal material comprising providing at least one mesogenic compound, at least one triplet sensitizer, and at least one photo-reactive chiral compound, wherein the photo-reactive chiral compound is capable of undergoing a photochemical reaction resulting in the loss of the chirality of the photo-reactive chiral compound; combining the at least one mesogenic compound, at least one triplet sensitizer, and at least one photo-reactive chiral compound to form a mixture; and irradiating the mixture for a period of time.

ADVANTAGEOUS EFFECT OF THE INVENTION

The present invention includes several advantages, not all of which are incorporated in a single embodiment. The present invention relies on triplet sensitization rather than direct irradiation of a photo-tunable chiral dopant (PTCD). The inventive use of triplet sensitizers results in increased sensitivity to the photoradiation, and lower radiation doses can be applied and degradation of cholesteric liquid crystal material is prevented. Patterned films with different colors can be produced using a cholesteric liquid crystal mixture containing the triplet sensitizer and one or more photo-tunable chiral dopants, depending on the intensity and/or duration of radiation. The materials of the invention are simple, stable and easily available molecules, which can be conveniently included into nematic liquid crystal materials. The optical changes brought about by the inventive process are large and can easily be detected. The invention is especially suited to single layer patterning in a sheet comprising dispersed liquid crystal domains such as a coating of polymer dispersed liquid crystals (PDLC) on a flexible plastic substrate.

DETAILED DESCRIPTION OF THE INVENTION

The present invention relates to a photo-tunable dopant composition comprising a photo-reactive chiral compound and a triplet sensitizer. The present invention utilizes the photo-tunable dopant in a cholesteric liquid crystal material comprising a triplet sensitizer and one or more photo-tunable chiral dopants (PTCD) that change chirality upon irradiation of the triplet sensitizer. The present invention also provides methods of manufacturing.

The inventive use of triplet sensitizers results in increased sensitivity to the photoradiation, compared to the direct irradiation of photoisomerizable chiral materials of prior art, therefore lower radiation doses can be applied and degradation of cholesteric liquid crystal material is prevented. Furthermore, the amount of degradation of the photo-tunable chiral dopant compound is proportional to amount of light absorbed by the triplet sensitizer, so patterned films with different colors can be produced using a cholesteric liquid crystal mixture containing the triplet sensitizer and one or more photo-tunable chiral dopant, depending on the intensity and/or duration of radiation. Because the invention relies on triplet sensitization rather than direct irradiation of a photo-tunable chiral dopant, the irradiation can be done at wavelengths longer than 350 nm.

The invention involves a photo-irradiation process that is efficient in the use of light. As the reaction involves irradiation of a triplet sensitizer and then a triplet excited state energy transfer to a photo-tunable chiral dopant, rather than direct irradiation of the photo-tunable chiral dopant, quantum efficiencies are usually higher. This is mainly because direct light absorption by photo-tunable chiral dopants at wavelengths below 350 nm is very inefficient as most liquid crystal materials have significant absorption below 350 nm. The degree of conversion of photo-tunable chiral dopants is also higher with the triplet sensitization process of this invention than with direct excitation of photo-tunable chiral dopants. A relatively large change in optical properties can be obtained at low exposure to the irradiation light.

The present invention addresses the problems in the prior art by using a mixture comprising a triplet sensitizer and one or more photodegradable chiral compounds that irreversibly degrade upon photoirradiation of the triplet sensitizer. The present invention involves the use of a triplet sensitizer and a photo-tunable chiral dopant for a liquid crystal material in conjunction with photolithography or other masking techniques. The present invention uses a triplet sensitization scheme for efficient photoreactions of photo-tunable chiral dopants to address issues regarding inefficient irradiation below 400 nm. In the inventive scheme, a triplet sensitizer molecule of appropriate triplet energy is irradiated to bring about the desired reaction in photo-tunable chiral dopant and induce change in the pitch length of chiral nematic liquid crystal material. Thus, excitation of an appropriate triplet sensitizer molecule results in triplet energy transfer from the sensitizer to the photo-tunable chiral dopant, which subsequently undergoes desired reaction to reduce the chirality and change the pitch length. Since direct irradiation of photo-tunable chiral dopants is not required, this scheme allows for selection of an appropriate triplet sensitizer that can be irradiated at longer wavelengths where photo-tunable chiral dopant doesn't have to have any absorption. An additional advantage of the present invention is increased quantum efficiency of the overall process.

Any compound whose chirality can be altered upon triplet sensitization either resulting in racemization or decomposition and which does not react adversely with the other components of the system is contemplated as being suitable for use in the invention. In other words, the preferred compound is a photo-reactive chiral compound capable of undergoing a photochemical reaction resulting in the loss of the chirality of photo-reactive chiral compound.

Although there are numerous photochemical mechanisms by which chirality of various compounds may be destroyed or altered, the preferred mechanisms for use in the invention generally fall into two categories:
1. Triplet sensitized racemization and/or isomerization of the photo-tunable chiral dopant;
2. Triplet sensitized bond cleavage reactions of the photo-tunable chiral dopant.

The structure of a given photo-tunable chiral dopant compound will depend upon its triplet energy and nature of its triplet sensitized reaction. Since the photochemical racemization or isomerization and bond cleavage reactions and detailed mechanisms of these processes are well known to the skilled chemist, it would be well within the skill in the art to select and synthesize suitable compounds for use in the present invention once it is decided which triplet sensitized photochemical process of photo-tunable chiral dopant will be employed.

As noted above, in triplet sensitized photochemical reactions there are basically two ways to destroy the chirality of a photo-tunable chiral dopant bond cleavage process and racemization and/or isomerization process. In triplet sensitized racemization process, energy transfer to the photo-tunable chiral dopant molecule causes no structural change, other than conversion of one enantiomer into its mirror image (photo-racemization of an optically pure reagent). In this system, the ultimate obtainable optical purity of the photo-tunable chiral dopant at the photostationary state ($\gamma$PSS) by irradiation with circularly polarized light (CPL) is determined by Kuhn anisotropy. There are a number of photo-tunable chiral dopants systems available that undergo triplet sensitized racemization and are capable of providing a $\gamma$PSS large enough to be useful for switching a liquid crystal (see Table 2).

In the triplet sensitized bond cleavage reactions, the ultimate result is elimination of a group or substituent from the chiral carbon, thereby rendering the carbon achiral, or to cleave the chiral carbon itself from the molecule, which destroys the chirality of both the original molecule and the leaving group. Both of these methods find their basis in synthetic organic chemistry, where photoremovable protecting groups are frequently used during synthesis. The essence of both is to select a known photoremovable protecting group as is known in the art, employ it in a position where the removal of the protecting group destroys the chirality of the compound, and then use an appropriate triplet sensitizer to initiate the desired reaction. Photoremovable protecting groups are discussed in some detail in Binkley, R. W., et al., Synthetic Organic Chemistry, Plenum Press, New York, N.Y. (1984) (Chapter 7, pp. 375-423), incorporated herein by reference. Known photoremovable protecting groups include esters of sulfonic acids, carboxylic acids and carboxylic acid esters, hydrazones (e.g., N,N-dimethylhydrazones), acetal forming dithio groups, 1,2-diphenylmaleimides, o-nitrophenylamino groups, aryl azido ethers, benzoin esters (e.g., methoxy substituted benzoin esters), polymer bound phenacyl groups, phenacyl groups (e.g., methoxyphenacyl), and benzyloxycarbonyl compounds. When incorporated into the structure of a chiral compound, such groups can be used to destroy the chirality of the compound upon triplet-sensitized reaction. The selection of appropriate groups for use in a photo-tunable chiral dopant will depend upon the compatibility of the particular photo-tunable chiral dopant and its triplet sensitized reaction products with the other components in the system.

A preferred category of photo-tunable chiral dopants includes a photocleavable leaving group directly attached to the chiral carbon. Upon triplet-sensitized irradiation, the bond between the chiral carbon and the leaving group is cleaved, thereby destroying the chirality of the photo-tunable chiral dopant compound. There are numerous photochemical mechanisms by which a labile substituent on a chiral carbon may be eliminated by photoirradiation. Accordingly, there are countless compounds falling within this category. However, as noted above, the chemical mechanisms are well known and those of ordinary skill in the art will know the necessary structural requirements needed for a compound to undergo triplet sensitized bond cleavage with destruction of chirality according to a given mechanism. Preferred compounds of this category are typically characterized by an aromatic ring or ring system having the chiral carbon bound to it directly, beta to the ring through a carbon, a substituted carbon or a heteroatom such as oxygen or sulfur. This is because the aromatic ring or ring system acts to increase the lability of the leaving group. To enhance this function of the ring or ring system it may often be activated by various electron-withdrawing substituents such as one or more nitro groups as is known in the art. Attached to the chiral carbon will be a photocleavable leaving group, such as a carboxylic acid, a carboxylic acid ester, or the like. Other suitable leaving groups and the structural requirements for their photo-lability would be known in the art. In addition, the chiral carbon may also frequently include electron withdrawing groups, such as a cyano group, to increase the lability of the leaving group.

Examples of such compounds include aryl cyano acids, aryloxy acetic acids, α-aryl propionic acids, benzoin esters, and the like.

As noted, the structure, synthesis and chemistry of such compounds are determined substantially by the specific photochemical mechanism at work, and would be known to those of ordinary skill in the art in view of the instant disclosure. For example, when one desires to utilize the well known mechanism of photodecarboxylation of an acid group, aryl cyano acids, aryloxy acetic acids and arylcyano acetic acids are commonly employed. These well know photochemical techniques as well as other photochemical techniques suitable for adaptation to the present invention are well understood in the field of synthetic organic chemistry as discussed in, for example, Coyle, J. D., Introduction to Organic Photochemistry, John Wiley & Sons (1986) (Chapter 4, pp 107-111); Cameron et al., J. Am. Chem. Soc., Vol. 113, No. 11, pp 4303-4313 (1991); Sonawabe et al., Tetrahedron Asymmetry, Vol. 3, No. 2, pp. 163-192 (1992); and Davidson et al., J. Chem. Soc. Perkin II, p 1357 (1972), all of which are incorporated herein by reference. Those of ordinary skill in the art would be able to select and synthesize appropriate photo-tunable chiral dopants within this category in view of the instant disclosure.

Preferred photo-tunable chiral dopants that undergo triplet sensitized racemization and/or isomerization useful for the practice of this invention include, but are not limited to, those shown below in Table 2:

TABLE 2

| Photo-Tunable Chiral Dopants | |
|---|---|
| PTCD-1 | 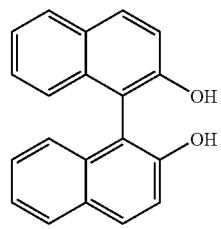 |
| PTCD-2 | 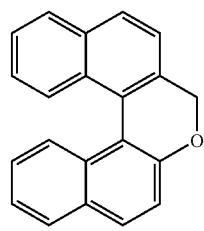 |
| PTCD-3 | 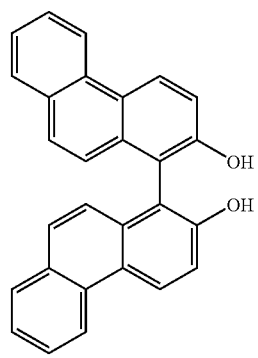 |

TABLE 2-continued

| Photo-Tunable Chiral Dopants | |
|---|---|
| PTCD-4 | 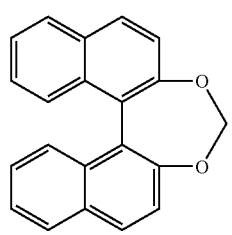 |
| PTCD-5 | 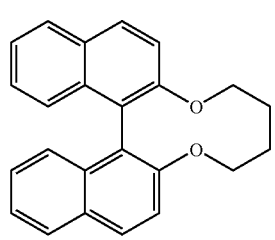 |
| PTCD-6 | 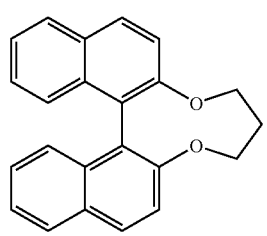 |
| PTCD-7 | 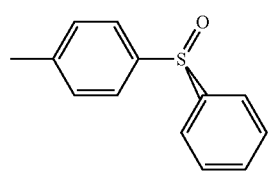 |
| PTCD-8 | 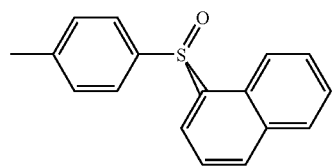 |
| PTCD-9 | 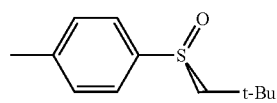 |
| PTCD-10 | 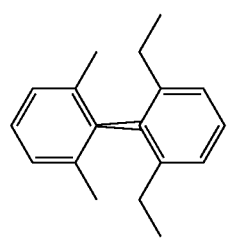 |

TABLE 2-continued

Photo-Tunable Chiral Dopants

PTCD-11

[Chemical structure showing a biphenyl-type compound with COOMe and MeOOC substituents]

Since the chemistry of photodecarboxylation is one of the better understood mechanisms, compounds of this category having a photocleavable carboxylic acid group are particularly suitable for adaptation to use as photo-tunable chiral dopants. In these compounds, the chiral carbon may be either directly alpha to the ring or ring system, such as in the aryl-cyano acetic acid, or may be beta to the ring or ring system through a bond or heteroatom. In these photochemical reactions, the leaving group is a photocleavable carboxylic acid or acid ester, the lability of which may be enhanced by the inclusion on the chiral center of an electron withdrawing group such as a cyano group, or by forming the chiral carbon beta to the ring system through a heteroatom such as oxygen or sulfur, as in the formulas above. Upon triplet-sensitized irradiation, the acid moiety is eliminated as $CO_2$ thereby destroying the chirality of the compound.

Aryl ketones are known to undergo triplet sensitized bond cleavage reactions and are useful as triplet sensitized photo-tunable chiral dopants. These molecules undergo triplet sensitized bond cleavage of the chiral center to destroy the chirality, wherein the chiral carbon is alpha to the keto group. The keto group is bound to an aromatic ring or ring system to enhance the lability of the alpha leaving group. These compounds employ the well know mechanism of alpha cleavage of the carbon alpha to the aryl ketone and are especially preferred. The photochemistry of alpha-cleavage has been known for decades and is readily adapted to the claimed utility by those of ordinary skill in the art in view of the instant disclosure. For example, the photochemistry of the alpha-cleavage is discussed at length in Chapter 13 of Turro, Modern Molecular Photochemistry, The Benjamin/Cummings Publishing Co., Inc., (1978), and the footnotes therein, and by Lewis et al., J. Am. Chem. Soc. 95:18, pp 5973-76 (1973), all of which are incorporated herein by reference. The essence of this chemistry is in the photo-cleavability of a leaving group in the alpha position to a carbonyl, in particular, alpha to a ketone group. The susceptibility of alpha leaving group to photo-cleavage is most pronounced when the keto group is directly attached to an aromatic ring, which provides an excellent electron withdrawing sink rendering the alpha-leaving group (beta to the ring) particularly labile. Hence, especially preferred compounds according to this embodiment are aryl ketones.

When the alpha carbon is a chiral center, such compounds will have photo-tunable chirality. Accordingly, these compounds are excellent additives to adjust the chirality of a liquid crystal composition. Upon triplet-sensitized irradiation, the bond between the keto carbon and alpha carbon is easily cleaved, eliminating the chiral center and thereby destroying the chirality of the molecule and the leaving group. Therefore, the preferred alpha-cleavable photo-tunable chiral dopants are aromatic ketones generally characterized by a keto group directly attached to an aromatic ring or ring system, and a chiral center alpha to the keto group. The aromatic ring or ring system may be mesogenic, although this is not a requirement. Suitable aromatic groups include substituted or unsubstituted phenyls, biphenyls, aryls, heteroaryls and the like. The synthesis of compounds having these minimum requirements would be well known to those of ordinary skill in the art. It is contemplated that virtually any such compounds fulfilling these minimum requirements will have triplet sensitized photo-tunable chirality and be suitable for use in the instant invention.

In addition to photo-tunable chiral dopants, the cholesteric liquid crystal material may further comprises one or more additional chiral dopants that do not show a substantial change of chirality, but instead retain their chirality, under the same conditions where the photo-tunable chiral dopant loses its chirality. Thus, the additional chiral dopants should retain their chirality when irradiation of the triplet sensitizer results in complete loss of chirality in photo-tunable chiral dopant. These additional chiral dopants are hereinafter also referred to as 'non-photo-tunable' chiral dopants.

The non-photo-tunable chiral dopant added to the nematic mixture to induce the helical twisting of the mesophase, thereby allowing reflection of visible light, can be of any useful structural class. The choice of dopant depends upon several characteristics including among others its chemical compatibility with the nematic host, helical twisting power, temperature sensitivity, and light fastness. Many chiral dopant classes are known in the art: e.g., G. Gottarelli and G. Spada, *Mol. Cryst. Liq. Crys.*, 123, 377 (1985); G. Spada and G. Proni, *Enantiomer*, 3, 301 (1998) and references therein, incorporated herein by reference. Typical well known dopant classes include 1,1-binaphthol derivatives; isosorbide and similar isomannide esters as disclosed in U.S. Pat. No. 6,217, 792; TADDOL derivatives as disclosed in U.S. Pat. No. 6,099,751; and the pending spiroindanes esters as disclosed in U.S. patent application Ser. No. 10/651,692 by T. Welter et al., filed Aug. 29, 2003, titled "Chiral Compounds And Compositions Containing The Same," hereby incorporated by reference.

The triplet sensitizer (S) used in the invention initiates the racemization, either by bond cleavage or isomerization, of the reactant photo-tunable chiral dopant following absorption of actinic radiation. The sensitized racemization process is illustrated in Scheme 1, below. The process that produces the racemization of the photo-tunable chiral dopant takes place in the lowest excited triplet state of the photo-tunable chiral dopant ($^3$PTCD). It involves a racemization of $^3$PTCD to produce an achiral product P that may or may not be in its lowest triplet excited state ($^3$P). If the product is in the triplet excited state, $^3$P can subsequently transfer its energy to another molecule of photo-tunable chiral dopant producing more $^3$P, which can in turn isomerize to additional $^3$P to result in a chain process. This results in a very highly efficient process, characterized by high quantum efficiency. Energy loss from $^3$PTCD to ground state photo-tunable chiral dopant or so-called intersystem crossing of $^3$PTCD to ground state photo-tunable chiral dopant may also occur, which in effect terminates the process.

The sensitizer must be capable of producing $^3$PTCD by transferring energy from its own lowest triplet excited state ($^3$S) after the sensitizer has absorbed light. To be effective in producing $^3$PTCD, the lowest triplet energy of said photo-reactive chiral compound is lower than the lowest triplet energy of said triplet sensitizer. If the lowest triplet energy of the sensitizer is lower than the lowest triplet energy of the photo-reactive chiral compound, the lowest triplet energy of the sensitizer may be no more than about 4-6 kcal/mole below that of the reactant (photo-reactive chiral compound). More preferably, the triplet energy of the sensitizer is at least as high as that of the reactant.

Furthermore, it is important that, upon absorption of light, the sensitizer yields $^3S$ efficiently. Since the absorption of light by the sensitizer generally produces an excited singlet state of the sensitizer ($^1S$), the $^1S$ state must first undergo so-called intersystem crossing to produce $^3S$, which initiates the isomerization through triplet energy transfer to the photo-tunable chiral dopant.

Scheme 1

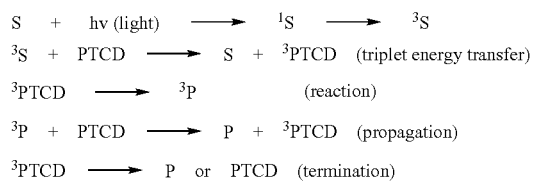

The amount of sensitizer used in the optical recording material of this invention depends largely on its optical density at the wavelength(s) of light used to sensitize the isomerization. Solubility of the sensitizer may also be a factor. In a nematic liquid crystal material, the sensitizer will generally comprise from 0.002 to 20% by weight of the photo-tunable chiral dopant of this invention. The sensitizer may also be covalently attached to the photo-tunable chiral dopant of this invention. Either a polymer bound sensitizer or a monomeric sensitizer with a low extinction coefficient may be utilized at relatively high levels. Such high levels may help facilitate the transfer of triplet energy.

Since this invention relies on a triplet sensitization process, the sensitizer must have a reasonably high intersystem crossing quantum yield for the formation of $^3S$ on absorption of light. Preferably, the intersystem crossing quantum yield of a sensitizer of this invention is at least 0.2. Most preferably, the intersystem crossing quantum yield of a sensitizer of this invention is at least 0.9.

The triplet energies of the sensitizers of this invention may be obtained in a variety of ways. Energies for some sensitizers or closely related analogs are disclosed in the prior art. For most sensitizers, the lowest triplet state energies may be obtained from low-temperature (e.g., 77° K) phosphorescence spectra. The sensitizer is typically dissolved in a solvent (such as ethyl acetate) or a mixture of solvents and the solution is placed in an optical cell and immersed in liquid nitrogen. The sensitizer is then excited with light at a wavelength where it absorbs, and its phosphorescence spectrum is measured. The highest energy absorption band (the so-called 0-0 band) in the phosphorescence spectrum can usually be taken as the energy of the lowest triplet state of sensitizer. For sensitizers with weak or obscured emission or in which the ground state and lowest triplet state have substantial differences in geometry, triplet energies can be obtained either from rates of energy transfer from a series of molecules with known triplet energies or from measured equilibria with triplets of known energies. The former procedure is described in *J. Amer. Chem. Soc.* 102, 2152 (1980) and the latter procedure is described in *J. Phys. Chem.* 78, 196 (1974).

In nematic liquid crystal materials, sensitizers and photo-tunable chiral dopants can occupy sites of different polarity, such that exact triplet energies are site dependent. To the extent that this is true for the sensitizers, cosensitizers (see below for identification) and photo-tunable chiral dopants in this invention, the reported triplet energies represent approximate or average values.

The ketocoumarins disclosed in *Tetrahedron* 38, 1203 (1982) represent one class of sensitizers useful for the practice of this invention. Other classes of sensitizers useful for the practice of this invention include xanthones, thioxanthones, arylketones and polycyclic aromatic hydrocarbons. Especially preferred are sensitizers that absorb ultraviolet light above 400 nm or visible light.

Specific sensitizers useful for the practice of this invention include, but are not limited to, those shown below:

TABLE 1

Triplet Sensitizers

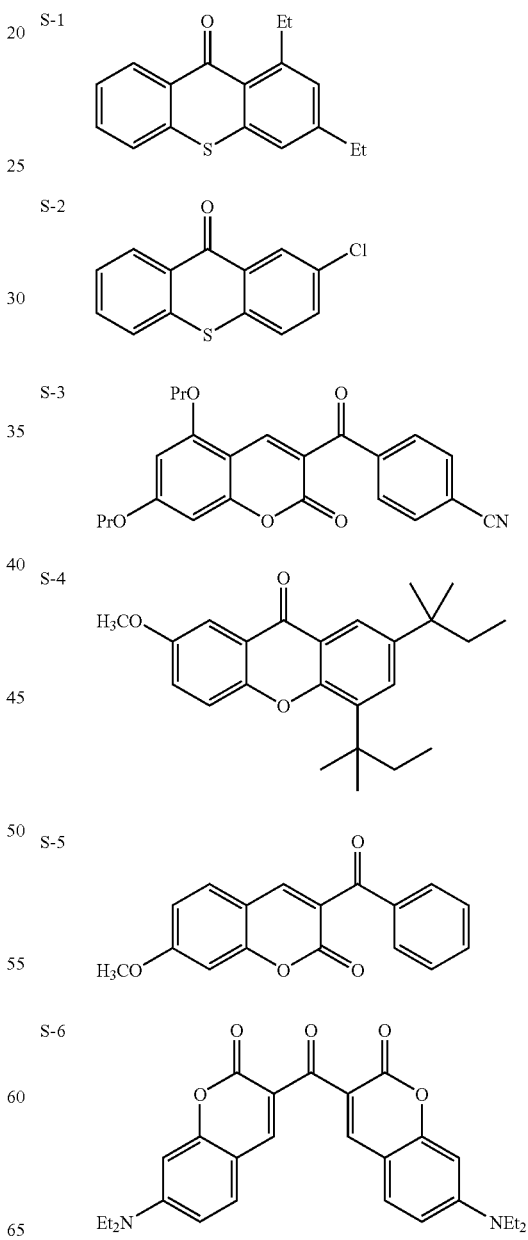

TABLE 1-continued

Triplet Sensitizers

S-7, S-8, S-9, S-10, S-11, S-12, S-13, S-14, S-15, S-16, S-17, S-18, S-19, S-20, S-21, S-22

Entry S-22 in Table 1 is an example of a sensitizer bearing a polymerizable vinyl group, and are therefore a suitable sensitizer for covalent attachment to the polymer matrix.

Triplet energies of sensitizers S-1, S-2, S-3, S-4, S-5, S-6, S-7, S-8 and S-10 have been measured (via phosphorescence) in ethyl acetate as 62, 64, 56, 63, 57.5, 50.5, 57, 60.5 56.5 and 56 kcal/mole, respectively. The triplet energies of the reactants noted above were measured by the procedure described in *J. Amer. Chem. Soc.* 102, 2152 (1980).

The nematic liquid crystal material of this invention may further comprise a so-called cosensitizer (CS) to assist in the transfer of triplet energy to photo-tunable chiral dopant. The transfer of triplet energy occurs efficiently only over a short distance (about 1.0-1.5 nm). If a cosensitizer with a triplet energy not too far above that of the sensitizer is added to the optical recording material, the cosensitizer may serve as a bridge in the transfer of triplet energy from $^3$S to PTCD, Scheme 2, even after a shell of product has formed around the sensitizer. Like the sensitizer, the cosensitizer should not have a triplet energy more than about 6 kcal/mole below the triplet energy of the reactant, and preferably not more than 4 kcal/mole below the triplet energy of the reactant.

The cosensitizer (CS) can also assist in the transfer of triplet energy from $^3$PTCD to PTCD, Scheme 2, as long as the cosensitizer has triplet energy not significantly greater than the triplet energy of P. While dependent on structure, the $^3$P energies are in the range of about 50-76 kcal/mole for the P of this invention. Thus, a cosensitizer of this invention must generally have a triplet energy in the range of about 45-72 kcal/mole. To be effective in producing $^3$PTCD, the lowest triplet energy of said photo-reactive chiral compound is lower than the lowest triplet energy of said triplet cosensitizer. If the lowest triplet energy of the cosensitizer is lower than the lowest triplet energy of the photo-reactive chiral compound, the lowest triplet energy of the cosensitizer may be no more than about 4-6 kcal/mole below that of the reactant (photo-reactive chiral compound). The cosensitizer should not absorb more than about 10 percent of the actinic radiation absorbed by the sensitizer, if it is to function as described. Otherwise, it is more properly considered as a sensitizer itself. If either a sensitizer or a cosensitizer produces excessive light absorption at the sensitization wavelength, it can restrict reaction of photo-tunable chiral dopant to a relatively thin layer near the exposed surface and reduce overall quantum yields due to inefficient light penetration through the rest of the sample.

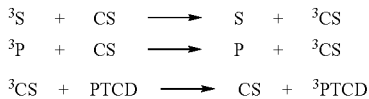

Scheme 2

The cosensitizer may be monomeric or it may be covalently attached to a polymeric matrix. Incorporating the cosensitizer as part of the polymer can allow high concentrations of cosensitizer and increase isomerization quantum efficiencies. A monomeric cosensitizer may comprise from about 2 to 20 percent by weight of the optical recording material. If covalently attached to the polymeric matrix, the cosensitizer may comprise from about 2 to 90 percent of the optical recording material.

Modern chiral nematic liquid crystal materials usually include at least one nematic host combined with a chiral dopant. In general, the nematic liquid crystal phase is composed of one or more mesogenic components combined to provide useful composite properties. Many such materials are available commercially. The nematic component of the chiral nematic liquid crystal mixture may be comprised of any suitable nematic liquid crystal mixture or composition having appropriate liquid crystal characteristics. Nematic liquid crystals suitable for use in the present invention are preferably composed of compounds of low molecular weight selected from nematic or nematogenic substances, for example from the known classes of the azoxybenzenes, benzylideneanilines, biphenyls, terphenyls, phenyl or cyclohexyl benzoates, phenyl or cyclohexyl esters of cyclohexanecarboxylic acid; phenyl or cyclohexyl esters of cyclohexylbenzoic acid; phenyl or cyclohexyl esters of cyclohexylcyclohexanecarboxylic acid; cyclohexylphenyl esters of benzoic acid, of cyclohexanecarboxylic acid and of cyclohexylcyclohexanecarboxylic acid; phenyl cyclohexanes; cyclohexylbiphenyls; phenyl cyclohexylcyclohexanes; cyclohexylcyclohexanes; cyclohexylcyclohexenes; cyclohexylcyclohexylcyclohexenes; 1,4-bis-cyclohexylbenzenes; 4,4-bis-cyclohexylbiphenyls; phenyl- or cyclohexylpyrimidines; phenyl- or cyclohexylpyridines; phenyl- or cyclohexylpyridazines; phenyl- or cyclohexyldioxanes; phenyl- or cyclohexyl-1,3-dithianes; 1,2-diphenylethanes; 1,2-dicyclohexylethanes; 1-phenyl-2-cyclohexylethanes; 1-cyclohexyl-2-(4-phenylcyclohexyl)ethanes; 1-cyclohexyl-2',2-biphenylethanes; 1-phenyl-2-cyclohexylphenylethanes; optionally halogenated stilbenes; benzyl phenyl ethers; tolanes; substituted cinnamic acids and esters; and further classes of nematic or nematogenic substances. The 1,4-phenylene groups in these compounds may also be laterally mono- or difluorinated. The liquid crystalline material of this preferred embodiment is based on the achiral compounds of this type. The most important compounds, that are possible as components of these liquid crystalline materials, can be characterized by the following formula R'—X—Y-Z-R" wherein X and Z, which may be identical or different, are in each case, independently from one another, a bivalent radical from the group formed by -Phe-, -Cyc-, -Phe-Phe-, -Phe-Cyc-, -Cyc-Cyc-, -Pyr-, -Dio-, —B-Phe- and —B-Cyc-; wherein Phe is unsubstituted or fluorine substituted 1,4-phenylene, Cyc is trans-1,4-cyclohexylene or 1,4-cyclohexenylene, Pyr is pyrimidine-2,5-diyl or pyridine-2,5-diyl, Dio is 1,3-dioxane-2,5-diyl, and B is 2-(trans-1,4-cyclohexyl)ethyl, pyrimidine-2,5-diyl, pyridine-2,5-diyl or 1,3-dioxane-2,5-diyl. Y in these compounds is selected from the following bivalent groups —CH=CH—, —C≡C—, —N=N(O)—, —CH=CY'—, —CH=N(O)—, —CH2-CH2-, —CO—O—, —CH2-O—, —CO—S—, —CH3-S—, —COO-Phe-COO— or a single bond, with Y' being halogen, preferably chlorine, or —CN; R' and R" are, in each case, independently of one another, alkyl, alkenyl, alkoxy, alkenyloxy, alkanoyloxy, alkoxycarbonyl or alkoxycarbonyloxy with 1 to 18, preferably 1 to 12 C atoms, or alternatively one of R' and R" is —F, —CF3, —OCF3, —Cl, —NCS or —CN. In most of these compounds R' and R' are, in each case, independently of each another, alkyl, alkenyl or alkoxy with different chain length, wherein the sum of C atoms in nematic media generally is between 2 and 9, preferably between 2 and 7. The nematic liquid crystal phases typically consist of 2 to 20, preferably 2 to 15 components. The above list of materials is not intended to be exhaustive or limiting. The lists disclose a variety of representative materials suitable for use or mixtures, which comprise the active element in electro-optic liquid crystal compositions.

Suitable chiral nematic liquid crystal compositions preferably have a positive dielectric anisotropy and include chiral material in an amount effective to form focal conic and twisted planar textures. Chiral nematic liquid crystal materials are preferred because of their excellent reflective characteristics, bistability and gray scale memory. The chiral nematic liquid crystal is typically a mixture of nematic liquid crystal and chiral material in an amount sufficient to produce the desired pitch length. Suitable commercial nematic liquid crystals include, for example, E7, E44, E48, E31, E80, BL087, BL101, ZLI-3308, ZLI-3273, ZLI-5048-000, ZLI-5049-100, ZLI-5100-100, ZLI-5800-000, MLC-6041-100.TL202, TL203, TL204 and TL205 manufactured by E. Merck (Darmstadt, Germany). Although nematic liquid crystals having positive dielectric anisotropy, and especially cyanobiphenyls, are preferred, virtually any nematic liquid crystal known in the art, including those having negative dielectric anisotropy should be suitable for use in the invention. Other nematic materials may also be suitable for use in the present invention as would be appreciated by those skilled in the art.

As used herein, a "liquid crystal display" (LCD) is a type of flat panel display used in various electronic devices. At a minimum, an LCD comprises a substrate, at least one conductive layer and a liquid crystal layer. The liquid crystal (LC) is used as an optical switch. The substrates are usually manufactured with transparent, conductive electrodes, in which electrical "driving" signals are coupled. The driving signals induce an electric field which can cause a phase change or state change in the liquid crystal material, the liquid crystal exhibiting different light reflecting characteristics according to its phase and/or state.

In one embodiment, at least one imagable layer is applied to the support. The imagable layer can contain an electrically imagable material. The electrically imagable material can be light emitting or light modulating. Especially preferred are chiral nematic liquid crystals. The chiral nematic liquid crystals can be polymer dispersed liquid crystals (PDLC). Structures having stacked imaging layers or multiple support layers, however, are optional for providing additional advantages in some case.

The liquid crystalline material preferred are chiral nematic liquid crystals. The chiral nematic liquid crystals can be polymer dispersed liquid crystals (PDLC). Structures having stacked imaging layers or multiple support layers, however, are optional for providing additional advantages in some case.

In a preferred embodiment, the electrically imagable material can be addressed with an electric field and then retain its image after the electric field is removed, a property typically referred to as "bistable". Especially preferred are chiral nematic liquid crystals. The chiral nematic liquid crystals can be polymer dispersed liquid crystals (PDLC).

Chiral nematic liquid crystal refers to the type of liquid crystal having finer pitch than that of twisted nematic and super-twisted nematic used in commonly encountered liquid crystal devices. Chiral nematic liquid crystals are so named because such liquid crystal formulations are commonly obtained by adding chiral agents to host nematic liquid crystals. Chiral nematic liquid crystals may be used to produce bistable or multi-stable displays. These devices have significantly reduced power consumption due to their nonvolatile "memory" characteristic. Since such displays do not require a continuous driving circuit to maintain an image, they consume significantly reduced power. Chiral nematic displays are bistable in the absence of a field; the two stable textures are the reflective planar texture and the weakly scattering focal conic texture. In the planar texture, the helical axes of the chiral nematic liquid crystal molecules are substantially perpendicular to the substrate upon which the liquid crystal is disposed. In the focal conic state the helical axes of the liquid crystal molecules are generally randomly oriented. Adjusting the concentration of chiral dopants in the chiral nematic material modulates the pitch length of the mesophase and, thus, the wavelength of radiation reflected. Chiral nematic materials that reflect infrared radiation and ultraviolet have been used for purposes of scientific study. Commercial displays are most often fabricated from chiral nematic materials that reflect visible light. Some known LCD devices include chemically etched, transparent, conductive layers overlying a glass substrate as described in U.S. Pat. No. 5,667,853, incorporated herein by reference.

The preferred liquid crystal material is a chiral liquid crystal materials having positive dielectric anisotropy and including chiral dopant in an amount effective to form focal conic and twisted planar textures. Chiral nematic liquid crystal materials are preferred because of their excellent reflective characteristics, bistability and gray scale memory. The chiral nematic liquid crystal is typically a mixture of nematic liquid crystal and chiral material in an amount sufficient to produce the desired pitch length, which can thereafter be modified by the photo-tunable chiral dopant additive. Suitable nematic liquid crystals include, for example, E7, E48, E31, E80, TL202, TL203, TL204 and TL205 manufactured by E. Merck. Although nematic liquid crystals having positive dielectric anisotropy, and especially cyanobiphenyls, are preferred, virtually any nematic liquid crystal known in the art, including those having negative dielectric anisotropy, should be suitable for use in the invention. Suitable chiral dopants include, for example, CB15, CE2, CE1, R1101 and TM74A, also manufactured by E. Merck. Other chiral nematic or cholesteric liquid crystals and liquid crystal mixtures suitable for use in the invention would be known to those of ordinary skill in the art in view of the instant disclosure.

In one embodiment, a chiral nematic liquid crystal composition may be dispersed in a continuous matrix. Such materials are referred to as "polymer dispersed liquid crystal" materials or "PDLC" materials. Such materials can be made by a variety of methods. For example, Doane et al. (*Applied Physics Letters*, 48, 269 (1986)) disclose a polymer disperse liquid crystal comprising approximately 0.4 µm droplets of nematic liquid crystal 5CB in a polymer binder. A phase separation method is used for preparing the polymer disperse liquid crystal. A solution containing monomer and liquid crystal is filled in a display cell and the material is then polymerized. Upon polymerization the liquid crystal becomes immiscible and nucleates to form droplets. West et al. (Applied Physics Letters 63, 1471 (1993)) disclose a polymer disperse liquid crystal comprising a chiral nematic mixture in a polymer binder. Once again a phase separation method is used for preparing the polymer disperse liquid crystal. The liquid crystal material and polymer (a hydroxy functionalized polymethylmethacrylate) along with a crosslinker for the polymer are dissolved in a common organic solvent toluene and coated on an indium tin oxide (ITO) substrate. A dispersion of the liquid crystal material in the polymer binder is formed upon evaporation of toluene at high temperature. The phase separation methods of Doane et al. and West et al. require the use of organic solvents that may be objectionable in certain manufacturing environments.

The contrast of the display is degraded if there is more than a substantial monolayer of N*LC domains. The term "substantial monolayer" is defined by the Applicants to mean that, in a direction perpendicular to the plane of the display, there is no more than a single layer of domains sandwiched between the electrodes at most points of the display (or the imaging layer), preferably at 75 percent or more of the points (or area) of the display, most preferably at 90 percent or more of the points (or area) of the display. In other words, at most, only a minor portion (preferably less than 10 percent) of the points (or area) of the display has more than a single domain (two or more domains) between the electrodes in a direction perpendicular to the plane of the display, compared to the amount of points (or area) of the display at which there is only a single domain between the electrodes.

One preferred embodiment, described in U.S. patent application Ser. No. 11/017,181, incorporated herein by reference utilizes a high contrast reflective display comprising at least one substrate, at least one electrically conductive layer and at least one close-packed, ordered monolayer of domains of electrically modulated material in a fixed, preferably crosslinked, polymer matrix and a method of making the same. The electrically modulated material is preferred to be a chiral nematic liquid crystal incorporated in a polymer matrix. Chiral nematic liquid crystalline materials may be used to create electronic displays that are both bistable and viewable under ambient lighting. Furthermore, the liquid crystalline materials may be dispersed as micron sized droplets in an aqueous medium, mixed with a suitable binder material and coated on a flexible conductive support to create potentially low cost displays. The operation of these displays is dependent on the contrast between the planar reflecting state and the weakly scattering focal conic state. In order to derive the maximum contrast from these displays, it is desired that the chiral nematic liquid crystal domains or droplets are spread on a conductive support as a close-packed ordered monolayer. It is possible to prepare such an ordered monolayer by first applying an aqueous dispersion of chiral nematic liquid crystal domains to the substrate in the presence of a suitable binder, allowing the domains or droplets to self-assemble into a close-packed ordered monolayer, preferably a hexagonal close-packed (HCP) monolayer and then allowing the binder material to set, become fixed or crosslink to preserve the close-packed ordered monolayer structure so that other aqueous layers can be spread above the imaging layer without affecting the close-packed structure.

The amount of material needed for a monolayer can be accurately determined by calculation based on individual domain size, assuming a fully closed packed arrangement of domains. (In practice, there may be imperfections in which gaps occur and some unevenness due to overlapping droplets or domains.) On this basis, the calculated amount is preferably less than about 150 percent of the amount needed for monolayer domain coverage, preferably not more than about 125 percent of the amount needed for a monolayer domain coverage, more preferably not more than 110 percent of the amount needed for a monolayer of domains. Furthermore, improved viewing angle and broadband features may be obtained by appropriate choice of differently doped domains based on the geometry of the coated droplet and the Bragg reflection condition.

In one preferred embodiment of the invention, the display device or display sheet has simply a single imaging layer of liquid crystal material along a line perpendicular to the face of the display, preferably a single layer coated on a flexible substrate. Such as structure, as compared to vertically stacked imaging layers each between opposing substrates, is especially advantageous for monochrome shelf labels and the like. Structures having stacked imaging layers, however, are optional for providing additional advantages in some case.

Preferably, the domains are flattened spheres and have on average a thickness substantially less than their length, preferably at least 50% less. More preferably, the domains on average have a thickness (depth) to length ratio of 1:2 to 1:6. The flattening of the domains can be achieved by proper formulation and sufficiently rapid drying of the coating. The domains preferably have an average diameter of 2 to 30 microns. The imaging layer preferably has a thickness of 10 to 150 microns when first coated and 2 to 20 microns when dried.

The flattened domains of liquid crystal material can be defined as having a major axis and a minor axis. In a preferred embodiment of a display or display sheet, the major axis is larger in size than the cell (or imaging layer) thickness for a majority of the domains. Such a dimensional relationship is shown in U.S. Pat. No. 6,061,107, hereby incorporated by reference in its entirety.

Liquid crystal domains may be preferably made using a limited coalescence methodology, as disclosed in U.S. Pat. Nos. 6,556,262 and 6,423,368, incorporated herein by reference. Limited coalescence is defined as dispersing a light modulating material below a given size, and using coalescent limiting material to limit the size of the resulting domains. Such materials are characterized as having a ratio of maximum to minimum domain size of less than 2:1. By use of the term "uniform domains", it is meant that domains are formed having a domain size variation of less than 2:1. Limited domain materials have improved optical properties.

An immiscible, field responsive light modulating material along with a quantity of colloidal particles is dispersed in an aqueous system and blended to form a dispersion of field responsive, light modulating material below a coalescence size. When the dispersion, also referred to herein as an emulsion, is dried, a coated material is produced which has a set of uniform domains having a plurality of electrically responsive optical states. The colloidal solid particle, functioning as an emulsifier, limits domain growth from a highly dispersed state. Uniformly sized liquid crystal domains are created and machine coated to manufacture light modulating, electrically responsive sheets with improved optical efficiency.

Specifically, a liquid crystal material comprising a triplet sensitizer and at least one photo-tunable chiral dopant may be dispersed an aqueous bath containing a water soluble binder material such as deionized gelatin, polyvinyl alcohol (PVA) or polyethylene oxide (PEO). Such compounds are machine coatable on equipment associated with photographic films. Preferably, the binder has a low ionic content, as the presence of ions in such a binder hinders the development of an electrical field across the dispersed liquid crystal material. Additionally, ions in the binder can migrate in the presence of an electrical field, chemically damaging the light modulating layer. The liquid crystal/gelatin emulsion is coated to a thickness of between 5 and 30 microns to optimize optical properties of light modulating layer. The coating thickness, size of the liquid crystal domains, and concentration of the domains of liquid crystal materials are designed for optimum optical properties.

In an exemplary embodiment, a liquid crystalline material comprising a triplet sensitizer and one or more photo-tunable chiral dopant and additional chiral dopants is homogenized in the presence of finely divided silica, a coalescence limiting material, (LUDOX® from duPont Corporation). A promoter material, such as a copolymer of adipic acid and 2-(methylamino)ethanol, is added to the aqueous bath to drive the colloidal particles to the liquid-liquid interface. The liquid crystal material is dispersed using ultrasound to create liquid crystal domains below 1 micron in size. When the ultrasound energy was removed, the liquid crystal material coalesced into domains of uniform size. The ratio of smallest to largest domain size varied by approximately 1:2. By varying the amount of silica and copolymer relative to the liquid crystalline material, uniform domain size emulsions of average diameter (by microscopy) approximately 1, 3, and, 8 micron were produced. These emulsions were diluted into gelatin solution for subsequent coating.

Domains of a limited coalescent material maintain their uniform size after the addition of the surfactant and after being machine coated. There were few, if any, parasitic domains having undesirable electro-optical properties within the dried coatings produced by the limited coalescence method. Coatings made using limited coalescence having a domain size of about 2 microns may have the greatest translucence. For constant material concentrations and coating thickness, limited coalescent materials having a domain size of about 2 microns in size are significantly more translucent than any sized domains formed using conventional dispersion.

Sheets made by the limited coalescence process have curves similar to those of conventionally dispersed materials. However, with 8 to 10 micron domains, the material may demonstrate reduced scattering due to the elimination of parasitic domains. Conventionally dispersed cholesteric materials contain parasitic domains, which reflect light in wavelengths outside the wavelengths reflected by the cholesteric material. Limited coalescent dispersions have reduced reflection in other wavelengths due to the elimination of parasitic domains. The increased purity of color is important in the development of full color displays requiring well separated color channels to create a full color image. Limited coalescent cholesteric materials provide purer light reflectance than cholesteric liquid crystal material dispersed by conventional methods. Such materials may be produced using conventional photographic coating machinery.

In order to provide suitable formulations for applying a layer containing the liquid crystal domains, the dispersions are combined with a hydrophilic colloid, gelatin being the preferred material. Surfactants may be included with the liquid crystal dispersion prior to the addition of gelatin in order to prevent the removal of the particulate suspension stabilizing agent from the droplets. This aids in preventing further coalescence of the droplets.

As for the suspension stabilizing agents that surround and serve to prevent the coalescence of the droplets, any suitable colloidal stabilizing agent known in the art of forming polymeric particles by the addition reaction of ethylenically unsaturated monomers by the limited coalescence technique can be employed, such as, for example, inorganic materials such as, metal salt or hydroxides or oxides or clays, organic materials such as starches, sulfonated crosslinked organic homopolymers and resinous polymers as described, for example, in U.S. Pat. No. 2,932,629; silica as described in U.S. Pat. No. 4,833,060; copolymers such as copoly(styrene-2-hydroxyethyl methacrylate-methacrylic acid-ethylene glycol dimethacrylate) as described in U.S. Pat. No. 4,965,131, all of which are incorporated herein by reference. Silica is the preferred suspension stabilizing agent.

Suitable promoters to drive the suspension stabilizing agent to the interface of the droplets and the aqueous phase include sulfonated polystyrenes, alginates, carboxymethyl cellulose, tetramethyl ammonium hydroxide or chloride, triethylphenyl ammonium hydroxide, triethylphenyl ammonium hydroxide, triethylphenyl ammonium chloride, diethylaminoethylmethacrylate, water soluble complex resinous amine condensation products, such as the water soluble condensation product of diethanol amine and adipic acid, such as poly(adipic acid-co-methylaminoethanol), water soluble condensation products of ethylene oxide, urea, and formaldehyde and polyethyleneimine; gelatin, glue, casein, albumin, gluten, and methoxycellulose. The preferred promoter is triethylphenyl ammonium chloride.

In order to prevent the hydrophilic colloid from removing the suspension stabilizing agent from the surface of the droplets, suitable anionic surfactants may be included in the mixing step to prepare the coating composition such as polyisopropyl naphthalene-sodium sulfonate, sodium dodecyl sulfate, sodium dodecyl benzene sulfonate, as well as those anionic surfactants set forth in U.S. Pat. No. 5,326,687 and in Section XI of Research Disclosure 308119, December 1989, entitled "Photographic Silver Halide Emulsions, Preparations, Addenda, Processing, and Systems", both of which are incorporated herein by reference. Aromatic sulfonates are more preferred and polyisopropyl naphthalene sulfonate is most preferred.

Suitable hydrophilic binders include both naturally occurring substances such as proteins, protein derivatives, cellulose derivatives (e.g. cellulose esters), gelatins and gelatin derivatives, polysaccharides, casein, and the like, and synthetic water permeable colloids such as poly(vinyl lactams), acrylamide polymers, poly(vinyl alcohol) and its derivatives, hydrolyzed polyvinyl acetates, polymers of alkyl and sulfoalkyl acrylates and methacrylates, polyamides, polyvinyl pyridine, acrylic acid polymers, maleic anhydride copolymers, polyalkylene oxide, methacrylamide copolymers, polyvinyl oxazolidinones, maleic acid copolymers, vinyl amine copolymers, methacrylic acid copolymers, acryloyloxyalkyl acrylate and methacrylates, vinyl imidazole copolymers, vinyl sulfide copolymers, and homopolymer or copolymers containing styrene sulfonic acid. Gelatin is preferred.

An especially preferred class of liquid crystal materials with which the inventive combination of a triplet sensitizer and a photo-tunable chiral dopant additive may be used include polymer, the polymer being distributed in the finished cell in a polymer network in an amount that provides a stabilizing or constraining effect on the pixels. In some cells, the polymer also serves to stabilize the focal conic and twisted planar textures in the absence of a field. The material used to form the polymer network is preferably soluble with the chiral nematic liquid crystal and phase separates upon solidification to form phase separated polymer domains. Suitable polymer materials include UV curable, thermoplastic and thermosetting polymers. Examples of suitable materials include those formed from monomers having at least two polymerizable double bonds, polymethylmethacrylates, bisacrylates, vinyl ethers, hydroxyfunctionalized polymethacrylates, urethanes, and epoxy systems to name a few. Other suitable materials would be known to those of ordinary skill in the art in view of the present disclosure. The amount of polymer to be used depends upon the polymer, liquid crystal, triplet sensitizer and photo-tunable chiral dopant. Useful results may be obtained with polymer contents ranging from about 0.1 to about 50% by weight based on the combined weight of polymer, chiral nematic liquid crystal and photo-tunable chiral dopant. For example, cells may be prepared with a polymer content ranging from about 0.1% to 50% using certain bisacrylates, from about 2 to 40% using certain hydroxy functionalized polymethacrylates, and about 40% when certain epoxies, thermoplastics and U.V. cured polymers are used. Preferably, the polymer content is kept low, below about 20% and more preferably below about 10%. This reduces the effect of any difference between the index of refraction of the polymer and the indices of refraction of the liquid crystal, which gives rise to "haze". Accordingly, when the polymer content is kept low the effect of any mismatch between the indices of refraction of the liquid crystal and polymer is minimized. It is to be understood, therefore, that the polymer content is subject to some variation, in as much as what constitutes a desirable or undesirable appearance of the cell in its various optical states is a matter of subjective judgment, and the need to prevent or limit diffusion from pixel to pixel may vary.

Chiral nematic liquid crystal materials and cells, as well as polymer stabilized chiral nematic liquid crystals and cells, are well known in the art and described in, for example, Yang et al., Appl. Phys. Lett. 60(25) pp 3102-04 (1992); Yang et al., J. Appl. Phys. 76(2) pp 1331 (1994); published International Patent Application No. PCT/US92/09367; and published International Patent Application No. PCT/US92/03504, these are incorporated herein by reference. Although chiral nematic liquid crystal mixtures are preferred for use in combination with photo-tunable chiral dopants and the inventive triplet sensitizers additives, it is contemplated within the scope of the invention that the inventive photo-tunable chiral dopant additives may be used in combination with other chiral dopants and liquid crystal materials. For example, the triplet sensitizer additives of the invention may be used with a combination of a chiral dopant and a photo-tunable chiral dopant and nematic liquid crystal, without the need for a separate chiral additive. In such instances the chiral dopant and photo-tunable chiral dopants in combination are determinant of the chirality and pitch of the mixture. Moreover, other optional components that may be added to the liquid crystal mixture include dyes, chiral dyes and, for example, fumed silica to adjust the stability and appearance of the various textures.

The liquid crystal composition necessary to obtain a desired starting pitch length will vary depending upon the particular liquid crystal, chiral dopant and photo-tunable chiral dopants used, as well as the desired mode of operation. The wavelength of the light that is reflected by the material is given by equation 1, where n is the average refractive index and p is the pitch length. The band width of the reflected light $\Delta\lambda$ is given by the following equation (3):

$$\Delta\lambda = \lambda \Delta n / n \tag{3}$$

where, $\Delta n$ is the birefringence of the liquid crystal. Wavelengths between about 350 nm and 850 nm are in the visible spectrum. Blue light is typically considered to have a wavelength of between about 460 and 480 nm, green light between about 500 and 520 nm, yellow light between about 570 and 585 nm and red light between about 630 and 700 nm. Accordingly, one of ordinary skill in the art will be able to select appropriate materials for the invention and their relative concentrations based upon the refractive indices of the materials involved, their twisting power and on general principles of chiral doping of liquid crystals to obtain optimum pitches to provide a desired color. Such techniques are well known in the art as taught, for example, in the manual distributed by Hoffmann-La Roche, ltd., entitled *How to Dope Liquid Crystal Mixtures in Order to Ensure Optimum Pitch and to Compensate the Temperature Dependence*, Schadt et al., (1990), and the manual distributed by E. Merck entitled *New Chiral Dopants With High Helical Twisting Power in Nematic Liquid Crystals*, Hochgesand et al., (1989), incorporated herein by reference. Of course, what constitutes a "good" red, blue, green or yellow for a given material will also be a matter of subjective judgment and may depend upon the use to which the material will be put.

Accordingly, one of ordinary skill in the art will be able to select appropriate materials for the invention and their relative concentrations based upon the refractive indices of the materials involved, their twisting power and on general principles of chiral doping of liquid crystals to obtain optimum pitches to provide a desired color. Such techniques are well known in the art as taught, for example, in the manual distributed by Hoffmann—Using the preferred materials wherein the chiral nematic and photo-tunable chiral dopant are of the same chirality, suitable pitch lengths for providing a good starting blue color may be obtained when the total amount of chiral material (including the photo-tunable chiral dopant) is present in an amount of from about 20% to about 50% by weight based on the combined weight of chiral nematic liquid crystal and photo-tunable chiral dopant. Typically, the photo-tunable chiral dopant will comprise from about 0.01 to about 20% of the total chiral component of the mixture, although it can constitute as much as 100% of the chiral component in the mixture. Preferred, is 0.1-10% total. The desired colors for the other pixels, e.g., green, yellow, red, orange etc., are then determined by the duration or amount of photoirradiation. Similarly, using the preferred materials wherein the chiral nematic and the photo-tunable chiral dopant are of opposite chirality, suitable pitch lengths for providing a good starting red color are obtained when the total amount of chiral material (including the photo-tunable chiral dopant) is present in an amount of from about 10 to about 30% by weight based on the combined weight of chiral nematic liquid crystal and photo-tunable chiral dopant additive. Here, the photo-tunable chiral dopant will typically comprise from about 0.1 to about 50% of the total chiral component of the mixture although, as before, it can constitute the entire chiral component of the mixture. The desired colors for the other pixels are then determined by the duration of photoirradiation of the triplet sensitizer and extent of reaction triplet sensitization induces in the photo-tunable chiral dopant.

In practical application, there may be a need to use more than one additive. Similarly, depending upon the application to which the material is to be put, it may be necessary to select different photo-tunable chiral dopants. For example, in order to extend the pitch change across the entire color spectrum to produce a full color display, it is preferable to select a photo-tunable chiral dopant with a high helical twisting power (HTP), such as a 1,1'-binaphthol. Similarly, when, for example, only blue and yellow pixels are desired one can select a photo-tunable chiral dopant having a lower helical twisting power. It is to be understood that the relative amounts of photo-tunable chiral dopant and chiral dopant, if any, may vary significantly depending upon the specific materials used, their twisting power and the effect of any polymer in the system.

The flexible plastic substrate can be any flexible self supporting plastic film that supports the thin conductive metallic film. "Plastic" means a high polymer, usually made from polymeric synthetic resins, which may be combined with other ingredients, such as curatives, fillers, reinforcing agents, colorants, and plasticizers. Plastic includes thermoplastic materials and thermosetting materials.

The flexible plastic film must have sufficient thickness and mechanical integrity so as to be self supporting, yet should not be so thick as to be rigid. Typically, the flexible plastic substrate is the thickest layer of the composite film in thickness. Consequently, the substrate determines to a large extent the mechanical and thermal stability of the fully structured composite film.

Another significant characteristic of the flexible plastic substrate material is its glass transition temperature (Tg). Tg is defined as the glass transition temperature at which plastic material will change from the glassy state to the rubbery state. It may comprise a range before the material may actually flow. Suitable materials for the flexible plastic substrate include thermoplastics of a relatively low glass transition temperature, for example up to 150° C., as well as materials of a higher glass transition temperature, for example, above 150° C. The choice of material for the flexible plastic substrate would depend on factors such as manufacturing process conditions, such as deposition temperature, and annealing temperature, as well as post-manufacturing conditions such as in a process line of a displays manufacturer. Certain of the plastic substrates discussed below can withstand higher processing temperatures of up to at least about 200° C., some up to 300-350° C., without damage.

Typically, the flexible plastic substrate is polyethylene terephthalate (PET), polyethylene naphthalate (PEN), polyethersulfone (PES), polycarbonate (PC), polysulfone, a phenolic resin, an epoxy resin, polyester, polyimide, polyetherester, polyetheramide, cellulose acetate, aliphatic polyurethanes, polyacrylonitrile, polytetrafluoroethylenes, polyvinylidene fluorides, poly(methyl(x-methacrylates), an aliphatic or cyclic polyolefin, polyarylate (PAR), polyetherimide (PEI), polyethersulphone (PES), polyimide (PI), Teflon poly(perfluoro-alboxy) fluoropolymer (PFA), poly(ether ether ketone) (PEEK), poly(ether ketone) (PEK), poly(ethylene tetrafluoroethylene)fluoropolymer (PETFE), and poly (methyl methacrylate) and various acrylate/methacrylate copolymers (PMMA). Aliphatic polyolefins may include high density polyethylene (HDPE), low density polyethylene (LDPE), and polypropylene, including oriented polypropylene (OPP). Cyclic polyolefins may include poly(bis(cyclopentadiene)). A preferred flexible plastic substrate is a cyclic polyolefin or a polyester. Various cyclic polyolefins are suitable for the flexible plastic substrate. Examples include Arton® made by Japan Synthetic Rubber Co., Tokyo, Japan; Zeanor T made by Zeon Chemicals L.P., Tokyo Japan; and Topas® made by Celanese A. G., Kronberg Germany. Arton is a poly(bis(cyclopentadiene)) condensate that is a film of a polymer. Alternatively, the flexible plastic substrate can be a polyester. A preferred polyester is an aromatic polyester such as Arylite. Although various examples of plastic substrates are set forth above, it should be appreciated that the substrate can also be formed from other materials such as glass and quartz.

The flexible plastic substrate can be reinforced with a hard coating. Typically, the hard coating is an acrylic coating. Such a hard coating typically has a thickness of from 1 to 15 microns, preferably from 2 to 4 microns and can be provided by free radical polymerization, initiated either thermally or by ultraviolet radiation, of an appropriate polymerizable material. Depending on the substrate, different hard coatings can be used. When the substrate is polyester or Arton, a particularly preferred hard coating is the coating known as "Lintec". Lintec contains UV cured polyester acrylate and colloidal silica. When deposited on Arton, it has a surface composition of 35 atom % C, 45 atom % 0, and 20 atom % Si, excluding hydrogen. Another particularly preferred hard coating is the acrylic coating sold under the trademark "Terrapin" by Tekra Corporation, New Berlin, Wis.

In one embodiment, a sheet supports a conventional polymer dispersed light modulating material. The sheet includes a substrate. The substrate may be made of a polymeric material, such as Kodak Estar film base formed of polyester plastic, and have a thickness of between 20 and 200 microns. For example, the substrate may be an 80 micron thick sheet of transparent polyester. Other polymers, such as transparent polycarbonate, can also be used. Alternatively, the substrate may be thin, transparent glass.

The LCD contains at least one conductive layer, which typically is comprised of a primary metal oxide. This conductive layer may comprise other metal oxides such as indium oxide, titanium dioxide, cadmium oxide, gallium indium oxide, niobium pentoxide and tin dioxide. See, Int. Publ. No. WO 99/36261 by Polaroid Corporation. In addition to the primary oxide such as ITO, the at least one conductive layer can also comprise a secondary metal oxide such as an oxide of cerium, titanium, zirconium, hafnium and/or tantalum. See, U.S. Pat. No. 5,667,853 to Fukuyoshi et al. (Toppan Printing Co.). Other transparent conductive oxides include, but are not limited to $ZnO_2$, $Zn_2SnO_4$, $Cd_2SnO_4$, $Zn_2In_2O_5$, $MgIn_2O_4$, $Ga_2O_3$—$In_2O_3$, or $TaO_3$. The conductive layer may be formed, for example, by a low temperature sputtering technique or by a direct current sputtering technique, such as DC-sputtering or RF-DC sputtering, depending upon the material or materials of the underlying layer. The conductive layer may be a transparent, electrically conductive layer of tin oxide or indium-tin oxide (ITO), or polythiophene, with ITO being the preferred material. Typically, the conductive layer is sputtered onto the substrate to a resistance of less than 250 ohms per square. Alternatively, conductive layer may be an opaque electrical conductor formed of metal such as copper, aluminum or nickel. If the conductive layer is an opaque metal, the metal can be a metal oxide to create a light absorbing conductive layer.

Indium tin oxide (ITO) is the preferred conductive material, as it is a cost effective conductor with good environmental stability, up to 90% transmission, and down to 20 ohms per square resistivity. An exemplary preferred ITO layer has a % T greater than or equal to 80% in the visible region of light, that is, from greater than 400 nm to 700 nm, so that the film will be useful for display applications. In a preferred embodiment, the conductive layer comprises a layer of low temperature ITO which is polycrystalline. The ITO layer is preferably 10-120 nm in thickness, or 50-100 nm thick to achieve a resistivity of 20-60 ohms/square on plastic. An exemplary preferred ITO layer is 60-80 nm thick.

The conductive layer is preferably patterned. The conductive layer is preferably patterned into a plurality of electrodes. The patterned electrodes may be used to form a LCD device. In another embodiment, two conductive substrates are positioned facing each other and cholesteric liquid crystals are positioned therebetween to form a device. The patterned ITO conductive layer may have a variety of dimensions. Exemplary dimensions may include line widths of 10 microns, distances between lines, that is, electrode widths, of 200 microns, depth of cut, that is, thickness of ITO conductor, of 100 nanometers. ITO thicknesses on the order of 60, 70, and greater than 100 nanometers are also possible.

The display may also contain a second conductive layer applied to the surface of the light modulating layer. The second conductive layer desirably has sufficient conductivity to carry a field across the light modulating layer. The second conductive layer may be formed in a vacuum environment using materials such as aluminum, tin, silver, platinum, carbon, tungsten, molybdenum, or indium. Oxides of these metals can be used to darken patternable conductive layers. The metal material can be excited by energy from resistance heating, cathodic arc, electron beam, sputtering or magnetron excitation. The second conductive layer may comprise coatings of tin oxide or indium-tin oxide, resulting in the layer being transparent. Alternatively, second conductive layer may be printed conductive ink.

For higher conductivities, the second conductive layer may comprise a silver based layer which contains silver only or silver containing a different element such as aluminum (Al), copper (Cu), nickel (Ni), cadmium (Cd), gold (Au), zinc (Zn), magnesium (Mg), tin (Sn), indium (In), tantalum (Ta), titanium (Ti), zirconium (Zr), cerium (Ce), silicon (Si), lead (Pb) or palladium (Pd). In a preferred embodiment, the conductive layer comprises at least one of gold, silver and a gold/silver alloy, for example, a layer of silver coated on one or both sides with a thinner layer of gold. See, Int. Publ. No. WO 99/36261 by Polaroid Corporation. In another embodiment, the conductive layer may comprise a layer of silver alloy, for example, a layer of silver coated on one or both sides with a layer of indium cerium oxide (InCeO). See U.S. Pat. No. 5,667,853, incorporated herein in by reference.

The second conductive layer may be patterned irradiating the multilayered conductor/substrate structure with ultraviolet radiation so that portions of the conductive layer are ablated therefrom. It is also known to employ an infrared (IR) fiber laser for patterning a metallic conductive layer overlying a plastic film, directly ablating the conductive layer by scanning a pattern over the conductor/film structure. See: Int. Publ. No. WO 99/36261 and "42.2: A New Conductor Structure for Plastic LCD Applications Utilizing 'All Dry' Digital Laser Patterning," 1998 SID International Symposium Digest of Technical Papers, Anaheim, Calif., May 17-22, 1998, no. VOL. 29, May 17, 1998, pages 1099-1101, both incorporated herein by reference.

The LCD may also comprise at least one "functional layer" between the conductive layer and the substrate. The functional layer may comprise a protective layer or a barrier layer. The protective layer useful in the practice of the invention can be applied in any of a number of well known techniques, such as dip coating, rod coating, blade coating, air knife coating, gravure coating and reverse roll coating, extrusion coating, slide coating, curtain coating, and the like. The liquid crystal particles and the binder are preferably mixed together in a liquid medium to form a coating composition. The liquid medium may be a medium such as water or other aqueous solutions in which the hydrophilic colloid are dispersed with or without the presence of surfactants. A preferred barrier layer may acts as a gas barrier or a moisture barrier and may comprise SiOx, AlOx or ITO. The protective layer, for example, an acrylic hard coat, functions to prevent laser light from penetrating to functional layers between the protective layer and the substrate, thereby protecting both the barrier layer and the substrate. The functional layer may also serve as an adhesion promoter of the conductive layer to the substrate.

In another embodiment, the polymeric support may further comprise an antistatic layer to manage unwanted charge build up on the sheet or web during roll conveyance or sheet finishing. In another embodiment of this invention, the antistatic layer has a surface resistivity of from $10^5$ to $10^{12}$. Above $10^{12}$, the antistatic layer typically does not provide sufficient conduction of charge to prevent charge accumulation to the point of preventing fog in photographic systems or from unwanted point switching in liquid crystal displays. While layers greater than $10^5$ will prevent charge buildup, most antistatic materials are inherently not that conductive and in those materials that are more conductive than $10^5$, there is usually some color associated with them that will reduce the overall transmission properties of the display. The antistatic layer is separate from the highly conductive layer of ITO and provides the best static control when it is on the opposite side of the web substrate from that of the ITO layer. This may include the web substrate itself.

Another type of functional layer may be a color contrast layer. Color contrast layers may be radiation reflective layers or radiation absorbing layers. In some cases, the rearmost substrate of each display may preferably be painted black. The color contrast layer may also be other colors. In another embodiment, the dark layer comprises milled nonconductive pigments. The materials are milled below 1 micron to form "nano-pigments". In a preferred embodiment, the dark layer absorbs all wavelengths of light across the visible light spectrum, that is from 400 nanometers to 700 nanometers wavelength. The dark layer may also contain a set or multiple pigment dispersions. Suitable pigments used in the color contrast layer may be any colored materials, which are practically insoluble in the medium in which they are incorporated. Suitable pigments include those described in Industrial Organic Pigments: Production, Properties, Applications by W. Herbst and K. Hunger, 1993, Wiley Publishers. These include, but are not limited to, Azo Pigments such as monoazo yellow and orange, diazo, naphthol, naphthol reds, azo lakes, benzimidazolone, diazo condensation, metal complex, isoindolinone and isoindolinic, polycyclic pigments such as phthalocyanine, quinacridone, perylene, perinone, diketopyrrolopyrrole, and thioindigo, and anthriquinone pigments such as anthrapyrimidine.

The functional layer may also comprise a dielectric material. A dielectric layer, for purposes of the present invention, is a layer that is not conductive or blocks the flow of electricity. This dielectric material may include a UV curable, thermoplastic, screen printable material, such as Electrodag 25208 dielectric coating from Acheson Corporation. The dielectric material forms a dielectric layer. This layer may include openings to define image areas, which are coincident with the openings. Since the image is viewed through a transparent substrate, the indicia are mirror imaged. The dielectric material may form an adhesive layer to subsequently bond a second electrode to the light modulating layer.

The process according to the present invention utilizes a cholesteric liquid crystal material comprising a triplet sensitizer and one or more photo-tunable chiral dopant (PTCD) that changes its chirality upon irradiation of the triplet sensitizer.

A preferred embodiment of the present invention relates to the process of preparing of a reflective film comprising a cholesteric liquid crystal material with planar orientation, exhibiting a broad waveband of reflection. Such a film is particularly useful as a broadband reflective polarizer for liquid crystal displays.

The cholesteric liquid crystal material used in this preferred embodiment comprises achiral and/or chiral mesogenic compounds, a triplet sensitizer, and one or more photo-tunable chiral dopant that lose their chirality upon irradiation of triplet sensitizer. The cholesteric liquid crystal material is coated and aligned onto a substrate. The cholesteric liquid crystal material is preferably selected to exhibit a reflection peak in the blue region of visible light or in or close to the UV region, but preferably outside the wavelength range used for the irradiation of the triplet sensitizer. Upon irradiation of the triplet sensitizer, the photo-tunable chiral dopant at the top of the layer undergoes a reaction and loses its chirality first, thus reducing the effective concentration of chiral molecules and thereby the pitch of the cholesteric liquid crystal material, whereas the photo-tunable chiral dopant at the bottom of the layer will not react as much, resulting in the formation of a pitch gradient and thereby a broadening of the reflection band. The pitch gradient and thereby the bandwidth of the reflection band can be controlled by careful selection of the amount, type and ratio of the triplet sensitizer and the photo-tunable chiral dopant. Thus, with inventive method broadband polarizers with a broad reflection band as well as notch polarizers with a reflection band of limited bandwidth can be prepared.

In a particularly preferred embodiment, the above effect is further enhanced by adding a dye to the cholesteric liquid crystal material having an absorption maximum adjusted to the wavelength of the radiation used for irradiation of the triplet sensitizer. Preferably, a dye is used whose absorption maximum lies outside the reflection wavelength range of the reflective film in order to exclude undesired absorptions during the use of the film.

The dye produces an intensity gradient of the radiation in the thickness direction of the film, thus the difference of the rate and extent of light absorption by triplet sensitizer which in turn modulates degradation of the photo-tunable chiral dopant between the top and the bottom of the film is increased, leading to an increased pitch gradient.

Another preferred embodiment of the present invention relates to the preparation of a reflective film comprising a polymerized cholesteric liquid crystal material with planar orientation, wherein the reflection wavelength varies in lateral directions along the film, e.g. in form of a regular pattern. Such a film is particularly suitable e.g. as color filter for liquid crystal displays or projection systems, or as- multicolor image for decorative and security uses.

According to this embodiment, a cholesteric liquid crystal material as described for the first preferred embodiment above is coated onto a substrate and aligned. The cholesteric liquid crystal material is preferably selected to exhibit a reflection peak in the blue region of visible light or in or close to the UV region, but preferably outside the wavelength range used for irradiation of the triplet sensitizer. The aligned cholesteric liquid crystal layer comprising a triplet sensitizer and at least one photo-tunable chiral dopant is then partially exposed to light of moderate intensity, e.g. by covering the layer with a photomask. In the exposed parts of the layer, the effective concentration of chiral material is reduced, as the photo-tunable chiral dopant decomposes and loses its chirality, therefore the selective reflection wavelength in this part of the film changes for example to green. The process is repeated, but with a different shaped photomask that covers different parts of the layer. The irradiation dose of triplet sensitizer is preferably higher than in the first step, which has the effect of further decreasing the effective concentration of chiral molecules in the exposed part of the mixture, so that the selective reflection wavelength in this part changes for example to red. The process can be repeated several times, with different irradiation doses of the triplet sensitizer, i.e. different intensities and exposure times.

It is also possible to use a photomask that comprises different parts having different transmissivity for the actinic radiation used for irradiation of the triplet sensitizer. For example, it is possible to use as photomask a black and white photocopy or photograph exhibiting different gray shades, which is printed or copied onto a transparent material. Alternatively, it is possible to irradiate selected parts of the cholesteric liquid crystal material coating comprising a triplet sensitizer and at least one photo-tunable chiral dopant by means of a finely focused radiation source, such as a laser beam. In this case, the triplet sensitizer have to be selected to show absorption of the emission wavelength of the laser used for irradiation of the triplet sensitizer.

In another preferred embodiment, the cholesteric liquid crystal material further comprises one or non-photo-tunable chiral dopants which do not show a substantial change of chirality, but instead retain their chirality, under the same conditions where the photo-tunable chiral dopant loses its chirality. Thus, the non-photo-tunable chiral dopants should retain their chirality when irradiation of the triplet sensitizer results in complete loss of chirality in photo-tunable chiral dopant. By adding a selected amount of one or more non-photo-tunable chiral dopants to the liquids crystal material and an appropriate triplet sensitizer, it is possible to control the position of the reflection band of the resulting coating. Thus, when preparing for example a broadband reflective polarizer as described in the first preferred embodiment above or a bistable polymer disperse liquid crystal display sheet with spot color for example a cholesteric liquid crystal material is used that comprises one or more non-photo-tunable chiral dopants, the amount and helical twisting power (HTP) of which is selected such that the cholesteric liquid crystal material mixture comprising only the non-photo-tunable chiral dopants shows reflection of red light. To this mixture are added one or more photo-tunable chiral dopant, the amount and helical twisting power (HTP) of which is selected such that the total mixture, comprising both photo-tunable chiral dopant and non-tunable chiral dopants, shows selective reflection of blue light. A film is prepared as described above. The resulting film will have a bandwidth extending from a minimum reflection wavelength in the blue region to a maximum reflection wavelength in the red region. This method can be applied analogously to the preparation of patterned films as described above. Thus, the different colors in the different regions of the resulting patterned polymer film can be controlled by appropriate selection of the amount and helical twisting power of the photo-tunable chiral dopant and non-tunable chiral dopants.

In a particularly preferred embodiment, the cholesteric liquid crystal material comprises photo-tunable chiral dopant and non-tunable chiral dopants having opposite twist sense. The resulting pitch length of the cholesteric liquid crystal material is then given by the amount and helical twisting power (HTP) of the two materials with different handedness. In this case, triplet sensitized decomposition of the photo-tunable chiral dopant having a given handedness upon photo-irradiation will lead to an increase of the effective concentration of the non-tunable material with the opposite handedness, leading to a decrease of the resulting pitch and thus to a decrease of the reflection wavelength of the cholesteric liquid crystal material.

The thickness of a reflective film prepared by the inventive method is preferably from 1 to 30 µm, in particular from 1.5 to 20 µm, very preferably from 2 to 10 µm. In case of reflective films with a pitch variation in the direction perpendicular to the plane of the film, the thickness is also influencing the bandwidth of the reflective film. Depending on the band position and the bandwidth, the thickness of the reflective film is preferably from 5 to 30 µm. For bandwidths of about 300 nm or more, a thickness of 10 to 20 µm is particularly preferred. For reflective films with smaller bandwidths e.g. in the range from 100 to 200 nm a thickness of 1.5 to 10 µm is preferred.

The following examples are provided to illustrate the invention.

EXAMPLE 1

The following example illustrates the effect of a triplet sensitizer S-2 (triplet energy $E_T$~64 kcal/mol) on change in the reflection wavelength band upon irradiating a chiral nematic liquid crystal mixture comprising a nematic host, a high twist chiral dopant and a photo-tunable dopant.

The nematic host mixture BL087 obtained from Merck, Darmstadt, Germany was combined with a high twist chiral dopant to create a chiral nematic liquid crystal (CLC) mixture with a reflection band centered at 580 nm. The cholesteric liquid crystal mixture was separated into two portions. To one portion (control) was added 5 wt % of PTCD-1,1,1'binapthol (triplet energy, $E_T$~55 kcal/mol). To the second portion (invention) was added 5 wt % PTCD-1 and 1 wt % S-2. Samples of both the control mixture (PTCD-1 only) and the invention mixture (PTCD-1 and S-2) were placed on a glass slide and subjected to long wavelength UV irradiation at 365 nm. The change in the wavelength of reflection as function of the amount of irradiation was noted.

Sample #1 (Control)

| Amount of irradiation (J/cm$^2$) | Wavelength of reflection (nm) |
|---|---|
| 0 | 465 |
| 11 | 475 |
| 33 | 485 |
| 55 | 490 |

Sample #2 (Invention)

| Amount of irradiation (J/cm$^2$) | Wavelength of reflection (nm) |
|---|---|
| 0 | 465 |
| 11 | 485 |
| 22 | 505 |
| 44 | 535 |
| 66 | 550 |

It is clear that the inventive sample undergoes a much greater change in wavelength upon irradiation of triplet sensitizer S-2 that has triplet energy higher than the triplet energy of PTCD-1. For example, irradiation of 55 J/cm$^2$ changes the wavelength of reflection of the control sample by only 25 nm whereas irradiation of 44 J/cm$^2$ changes the wavelength of reflection of the invention sample by 60 nm.

EXAMPLE 2

This example illustrates using the method of the invention to create a bi-stable flexible display with spot color.

A cholesteric liquid crystal mixture with reflection band centered at 670 nm was prepared by combining the nematic host mixture BL087 with a suitable high twist chiral dopant. PTCD-1 (5 wt %) and S-2 (1 wt %) were then added to this mixture. The wavelength of reflection was shifted to 550 nm.

A dispersion of the above mixture was then prepared as follows. To 241 grams of distilled water was added 3.6 grams of Ludox TM-50 colloidal silica suspension (obtained from DuPont) and a 10 wt % aqueous solution of a copolymer of methylaminoethanol and adipic acid comprising equimolar amounts of the two components. To this was added 108 grams of the cholesteric liquid crystal mixture. The mixture was stirred using a high-speed mixer and homogenized using a Microfluidics M110F homogenizer operating at a fluid pressure of 3000 psi. The resulting dispersion was filtered using a 23 μm filter. The droplet size distribution was measured using a Coulter Counter and the mean droplet size was found to be close to 10 μm.

The dispersion was combined with an aqueous solution of bovine gelatin to create a coating composition containing 8 wt % liquid crystal and 5 wt % gelatin. The composition was spread at a temperature of 45 C on ITO-coated polyethylene terephthalate (PET) obtained from Bekaert Specialty Films, LLC, to give a uniform wet coverage of 61.5 cm$^3$/m$^2$. The sputter coated ITO layer (300 ohm/sq resistivity) had a thickness of approximately 240 angstroms. The coating was allowed to dry at room temperature (23 C).

A mask was applied over the dried coating to expose a circular region of approximately one-inch diameter. This region was then selectively exposed to 366 nm UV radiation to create an area of spot color in the display. After exposure to 12 J/cm$^2$ of radiation the wavelength of reflection in the circular area had shifted from 550 nm to 620 nm and two regions of color could be very easily differentiated. A carbon-based conductive ink (Electrodag 423SS from Acheson Corporation) was then screen printed on top of the liquid crystal layer to cover both regions. A voltage pulse (square wave of 1000 Hz and duration of 100 ms) was then applied to the sample. It was found that an amplitude greater than 100 volts switched both regions into the bright or planar reflecting state and an amplitude of 40 volts switched the regions into the dark or weakly scattering focal conic state. Both regions were bi-stable.

The invention has been described in detail with particular reference to certain preferred embodiments thereof, but it will be understood that variations and modifications can be effected within the spirit and scope of the invention.

The invention claimed is:

1. A photo-tunable dopant composition comprising a photo-reactive chiral compound, wherein said photo-reactive chiral compound is capable of undergoing a photochemical reaction resulting in the loss of the chirality of said photo-reactive chiral compound, and a triplet sensitizer, wherein said photochemical reaction is triplet sensitization resulting in racemization and/or isomerization, and wherein said photo-reactive chiral compound is selected from the group consisting of:

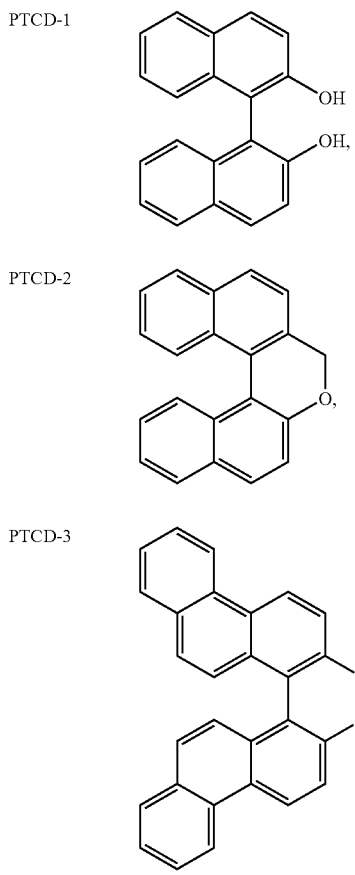

-continued

PTCD-4
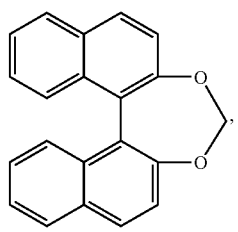

PTCD-5
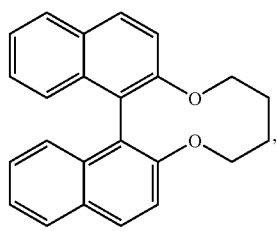

PTCD-6
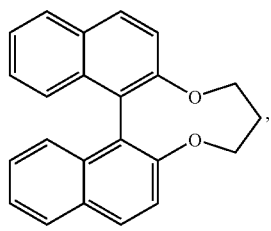

PTCD-7
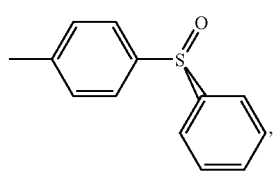

PTCD-8
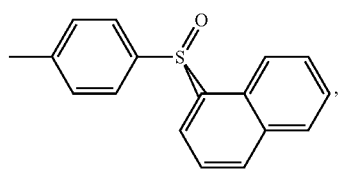

PTCD-9
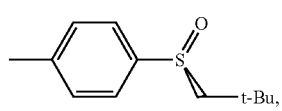

PTCD-10
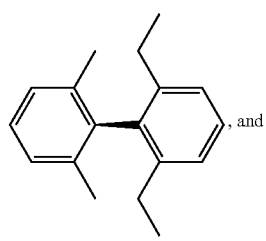, and

-continued

PTCD-11
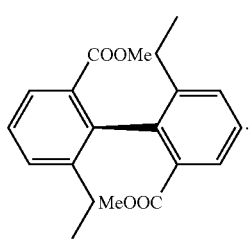

2. The photo-tunable dopant composition of claim 1 wherein said photo-reactive chiral compound is:

PTCD-1
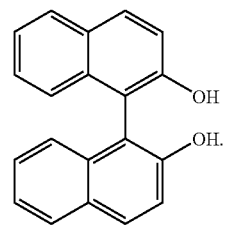

3. The photo-tunable dopant composition of claim 1 wherein said photo-reactive chiral compound is:

PTCD-3
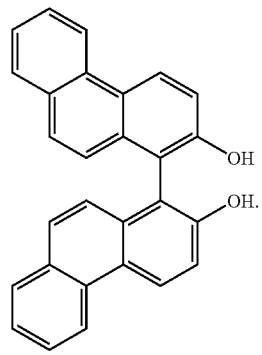

4. The photo-tunable dopant composition of claim 1 wherein said photo-reactive chiral compound is:

PTCD-5
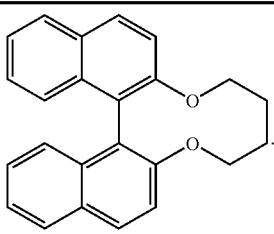

5. The photo-tunable dopant composition of claim 1 wherein said 5 photo-reactive chiral compound is:

PTCD-8

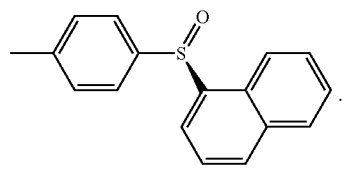

6. The photo-tunable dopant composition of claim 1 wherein said photochemical reaction is decomposition resulting in triplet sensitization bond cleavage reaction.

7. The photo-tunable dopant composition of claim 6 wherein said bond cleavage reactions affect photoremovable protecting groups or photocleavable leaving groups.

8. The photo-tunable dopant composition of claim 7 wherein said photoremovable protecting groups are esters of sulfonic acids, carboxylic acids, hydrazones, aryl azido ethers, benzoin esters, or benzyloxycarbonyl compounds.

9. The photo-tunable dopant composition of claim 7 wherein said photocleavable leaving groups are aryl cyano acids, aryloxy acetic acids, u-aryl propionic acids, or benzoin esters.

10. The photo-tunable dopant composition of claim 7 wherein said photocleavable leaving groups are aryl ketones.

11. The photo-tunable dopant composition of claim 1 further comprising at least one non-photo-tunable chiral dopant.

12. The photo-tunable dopant composition of claim 11 wherein said at least one non-photo-tunable chiral dopant is isosorbide, isomannide ester, TADDOL derivative, or spiroindane ester.

13. The photo-tunable dopant composition of claim 11 wherein said photo-tunable chiral dopant and said non-tunable chiral dopants have opposite twist sense.

14. The photo-tunable dopant composition of claim 1 wherein, when the lowest triplet energy of said photo-reactive chiral compound is higher than the lowest triplet energy of said triplet sensitizer, said lowest triplet energy of the photo-reactive chiral compound is no greater than 6 kcal greater than said lowest triplet energy of said triplet sensitizer.

15. The photo-tunable dopant composition of claim 1 wherein the lowest triplet energy of said photo-reactive chiral compound is lower than the triplet energy of said triplet sensitizer.

16. The photo-tunable dopant composition of claim 1 wherein said triplet sensitizer comprises from 0.002 to 20% by weight of the photo-tunable chiral dopant.

17. The photo-tunable dopant composition of claim 1 wherein said triplet sensitizer is covalently attached to said photo-reactive chiral compound.

18. The photo-tunable dopant composition of claim 1 wherein said triplet sensitizer comprises thioxanthone.

19. The photo-tunable dopant composition of claim 18 wherein said triplet sensitizer is:

S-1

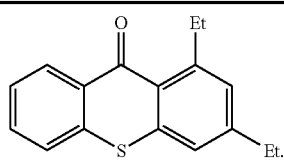

20. The photo-tunable dopant composition of claim 18 wherein said triplet sensitizer is:

S-2

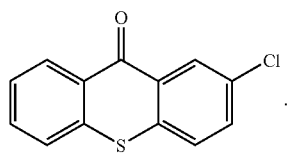

21. The photo-tunable dopant composition of claim 1 wherein said triplet sensitizer comprises ketocoumarin.

22. The photo-tunable dopant composition of claim 21 wherein said triplet sensitizer is:

S-2

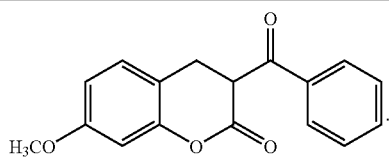

23. The photo-tunable dopant composition of claim 21 wherein said triplet sensitizer is:

S-7

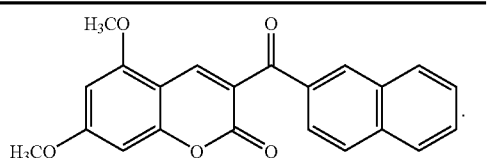

24. The photo-tunable dopant composition of claim 1 wherein said triplet sensitizer comprises at least one member selected from the group consisting of xanthones, thioxanthones, chlorothioxanthones, arylketones and polycyclic aromatic hydrocarbons.

25. The photo-tunable dopant composition of claim 1 wherein said triplet sensitizer absorbs light above 400 nm.

26. The photo-tunable dopant composition of claim 1 wherein said triplet sensitizer is selected from the group consisting of:

S-1

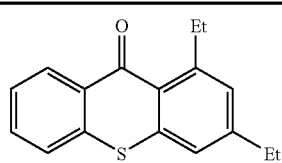

S-2

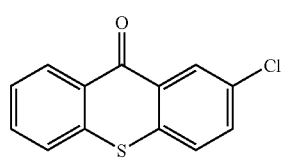

-continued
S-3 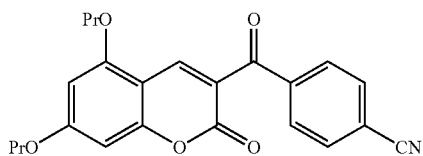
S-4 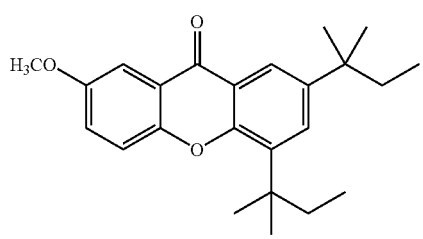
S-5 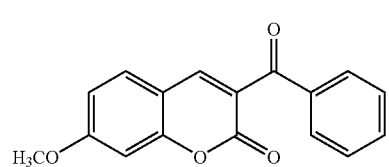
S-6 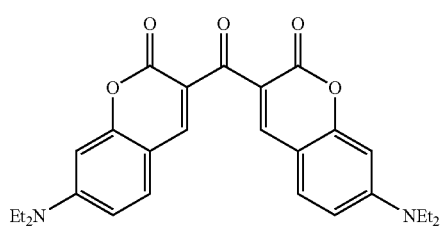
S-7 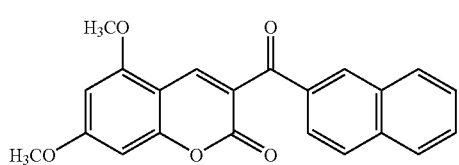
S-8 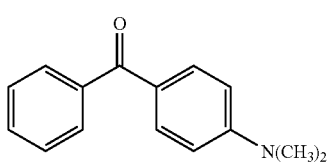
S-9 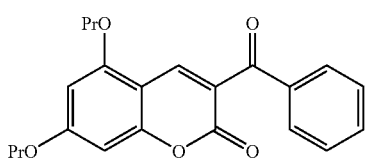
S-10 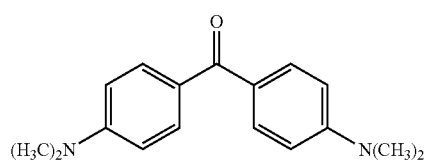
-continued
S-11 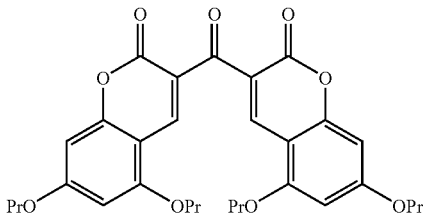
S-12 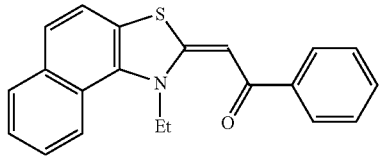
S-13 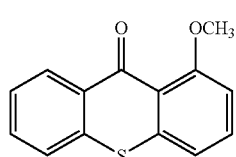
S-14 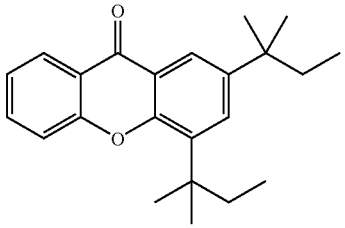
S-15 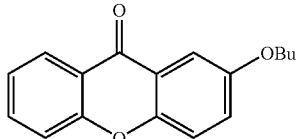
S-16 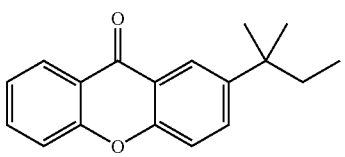
S-17 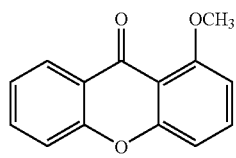
S-18 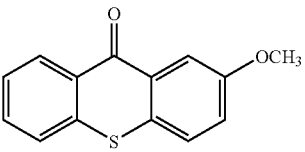
S-19 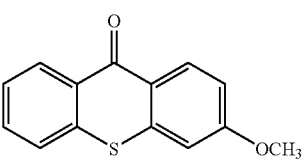

-continued
S-20 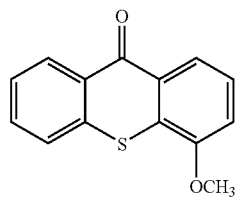
S-21 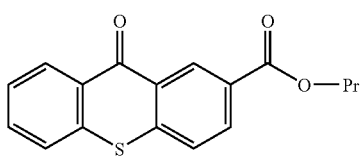
-continued
S-22 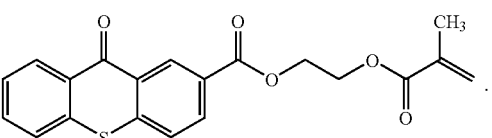
27. The photo-tunable dopant composition of claim 1 further comprising at least one cosensitizer.
28. The photo-tunable dopant composition of claim 27 wherein said cosensitizer has a triplet energy in the range of from 45 to 72 kcal/mole.
29. The photo-tunable dopant composition of claim 1 further comprising a nematic host.
* * * * *

UNITED STATES PATENT AND TRADEMARK OFFICE
CERTIFICATE OF CORRECTION

PATENT NO.       : 7,642,035 B2                                              Page 1 of 1
APPLICATION NO.  : 11/403970
DATED            : January 5, 2010
INVENTOR(S)      : Shukla et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 686 days.

Signed and Sealed this

Sixteenth Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,642,035 B2 | Page 1 of 1 |
| APPLICATION NO. | : 11/403970 | |
| DATED | : January 5, 2010 | |
| INVENTOR(S) | : Shukla et al. | |

It is certified that error appears in the above-identified patent and that said Letters Patent is hereby corrected as shown below:

Column 14,
Line 62, "polymer" should read --polymeric--.

Column 16,
Lines 40-42 should read:
-- -CH=CH-, -C≡C-, -N=N(O)-, -CH=CY'-, -CH=N(O)-, -CH2-CH2-, -CO-O-, -CH2-O-, -CO-S-, -CH2-S-, -COO-Phe-COO- or a single--.

Column 17,
Lines 23, 24, 25, and 37, each occurrence, "imagable" should read --imageable--.

Signed and Sealed this
First Day of March, 2011

David J. Kappos
*Director of the United States Patent and Trademark Office*